United States Patent
Li et al.

(10) Patent No.: US 12,159,607 B2
(45) Date of Patent: Dec. 3, 2024

(54) ELECTRONIC DEVICE PROJECTION METHOD, MEDIUM THEREOF, AND ELECTRONIC DEVICE

(71) Applicant: HUAWEI TECHNOLOGIES CO., LTD., Shenzhen (CN)

(72) Inventors: Xue Li, Wuhan (CN); Zhiqiang Wang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/305,155

(22) Filed: Apr. 21, 2023

(65) Prior Publication Data

US 2023/0260482 A1 Aug. 17, 2023

Related U.S. Application Data

(63) Continuation of application No. PCT/CN2021/122967, filed on Oct. 11, 2021.

(30) Foreign Application Priority Data

Oct. 23, 2020 (CN) .......................... 202011146713.0

(51) Int. Cl.
*G09G 5/22* (2006.01)
*G06F 3/14* (2006.01)
(Continued)

(52) U.S. Cl.
CPC ........... *G09G 5/227* (2013.01); *G06F 3/1454* (2013.01); *G09G 5/391* (2013.01); *H04N 9/3188* (2013.01);
(Continued)

(58) Field of Classification Search
CPC .................. G09G 5/227; G09G 5/391; G09G 2340/0407; G06F 3/1454; G06T 3/40; H04N 9/3188; H04N 21/440272
(Continued)

(56) References Cited

U.S. PATENT DOCUMENTS

2004/0017394 A1* 1/2004 Adachi ..................... G09G 5/14
715/744
2004/0189864 A1* 9/2004 Topper ............... H04N 21/4341
348/556
(Continued)

FOREIGN PATENT DOCUMENTS

CN 111192544 A 5/2020

*Primary Examiner* — Tom V Sheng
(74) *Attorney, Agent, or Firm* — Leydig, Voit & Mayer, Ltd.

(57) ABSTRACT

An electronic device projection method is provided. The projection method is applied to a first electronic device, and the first electronic device is communicatively connected to a second electronic device. The projection method includes: obtaining a screen resolution of the first electronic device; obtaining a screen resolution of the second electronic device, where a screen resolution ratio of the second electronic device is not equal to a screen resolution ratio of the first electronic device; adjusting the screen resolution of the first electronic device, to enable the screen resolution ratio of the first electronic device to be equal to the screen resolution ratio of the second electronic device; and collecting screen data of the first electronic device, and sending the screen data to the second electronic device, to display screen content of the first electronic device on the second electronic device.

20 Claims, 16 Drawing Sheets

(51) Int. Cl.
*G09G 5/391* (2006.01)
*H04N 9/31* (2006.01)
*H04N 21/4402* (2011.01)
*G06T 3/40* (2006.01)

(52) U.S. Cl.
CPC ....... *H04N 21/440272* (2013.01); *G06T 3/40* (2013.01); *G09G 2340/0407* (2013.01)

(58) Field of Classification Search
USPC ...................................................... 345/3, 3.3
See application file for complete search history.

(56) References Cited

U.S. PATENT DOCUMENTS

| | | | |
|---|---|---|---|
| 2010/0208149 A1* | 8/2010 | Morikuni | H04N 9/3188 353/101 |
| 2012/0176396 A1* | 7/2012 | Harper | G09G 5/373 345/589 |
| 2013/0057567 A1* | 3/2013 | Frank | G06F 3/1454 345/589 |
| 2013/0328878 A1* | 12/2013 | Stahl | G09G 5/005 345/1.3 |
| 2015/0002738 A1* | 1/2015 | Shuto | H04N 21/4122 348/383 |
| 2015/0278534 A1* | 10/2015 | Thiyagarajan | G06F 21/84 726/28 |
| 2016/0261923 A1* | 9/2016 | Huang | G06T 3/40 |
| 2017/0262247 A1* | 9/2017 | Yoganandan | G06F 3/1454 |
| 2018/0122130 A1* | 5/2018 | Kim | G06F 3/1454 |
| 2020/0057589 A1* | 2/2020 | Jo | G06F 3/14 |
| 2020/0310738 A1* | 10/2020 | Lee | G09G 5/38 |
| 2020/0388248 A1* | 12/2020 | Kimata | G09G 3/20 |
| 2020/0389508 A1* | 12/2020 | Hashimoto | H04L 65/1069 |
| 2021/0200497 A1* | 7/2021 | Torii | G09G 5/12 |
| 2022/0335911 A1* | 10/2022 | Zhao | G09G 5/373 |

* cited by examiner

ELECTRONIC DEVICE PROJECTION METHOD, MEDIUM THEREOF, AND ELECTRONIC DEVICE

CROSS-REFERENCE TO RELATED APPLICATIONS

This application is a continuation of International Application No. PCT/CN2021/122967, filed on Oct. 11, 2021, which claims priority to Chinese Patent Application No. 202011146713.0, filed on Oct. 23, 2020. The disclosures of the aforementioned applications are hereby incorporated by reference in their entireties.

TECHNICAL FIELD

This application relates to the field of computer technologies, and in particular, to an electronic device projection method, a medium thereof, and an electronic device.

BACKGROUND

With developments in computer science and technologies, a projection function has been widely applied to daily life of a user. For example, the user may synchronously project, to a screen of a television, all content displayed on a screen of a mobile phone. This projection manner is screen mirroring, and content of screen mirroring may be a picture, audio, a video, and the like.

However, when a screen resolution ratio of the mobile phone is inconsistent with that of the television, especially in a scenario in which the mobile phone plays a video in full screen, a screen interface of the mobile phone can only be projected to the middle of the screen of the television. As a result, black borders appear around the screen of the television, a display effect is poor, and user projection experience is affected.

SUMMARY

Embodiments of this application provide an electronic device projection method, a medium thereof, and an electronic device. The projection method in this application not only improves screen utilization of a projection receiving end, but also improves a projection display effect and user projection experience.

According to a first aspect, the projection method in this application is applied to a first electronic device, and the first electronic device is communicatively connected to a second electronic device. The projection method in this application includes:
obtaining a screen resolution of the first electronic device;
obtaining a screen resolution of the second electronic device, where a screen resolution ratio of the second electronic device is not equal to a screen resolution ratio of the first electronic device;
adjusting the screen resolution of the first electronic device, to enable the screen resolution ratio of the first electronic device to be equal to the screen resolution ratio of the second electronic device; and
collecting screen data of the first electronic device, and sending the screen data to the second electronic device, to display screen content of the first electronic device on the second electronic device.

In some embodiments of this application, the first electronic device is a projection source end, and includes but is not limited to a smart device having a projection function, like a mobile phone, a tablet computer, a notebook computer, or a palmtop computer. The second electronic device is a projection receiving end, and includes but is not limited to an electronic display device like a smart television, a smart screen, or a projector.

For example, the first electronic device is a mobile phone, and the second electronic device is a television. A screen resolution of the mobile phone is a×b, and a screen resolution of the television is A×B. In this case, a screen resolution ratio of the mobile phone is $$\frac{a}{b},$$

a screen resolution ratio of the television is $$\frac{A}{B}, \text{ and } \frac{a}{b}$$

is not equal to $$\frac{A}{B}.$$

It may be understood that a screen resolution is a quantity of pixels displayed on a screen, and a screen resolution ratio is a ratio of a quantity of pixels displayed on a screen in a horizontal direction to a quantity of pixels displayed on the screen in a vertical direction.

In an implementation of the first aspect, the first electronic device plays a video in a full-screen mode, and in the full-screen mode, a resolution of the video is equal to the screen resolution of the first electronic device.

In some embodiments of this application, a screen of the mobile phone displays a video interface, and the resolution of the video is equal to the screen resolution of the mobile phone. In other words, the screen of the mobile phone is in a full-screen video playback mode. For example, the screen resolution of the mobile phone is 2200×2480, the screen resolution ratio of the mobile phone is 7.1:8, the resolution of the video is also 2200×2480, and a resolution ratio of the video is also 7.1:8.

In an implementation of the first aspect, that a screen resolution ratio of the second electronic device is not equal to a screen resolution ratio of the first electronic device includes any one of the following cases:
the screen resolution ratio of the second electronic device is greater than the screen resolution ratio of the first electronic device, that is, $$\frac{A}{B} > \frac{a}{b};$$

and
the screen resolution ratio of the second electronic device is less than the screen resolution ratio of the first electronic device, that is, $$\frac{A}{B} < \frac{a}{b},$$

where
a and A respectively represent quantities of pixels displayed on screens of the first electronic device and the second electronic device in a first direction, b and B respectively represent quantities of pixels displayed on the screens of the first electronic device and the second electronic device in a second direction, and the first direction and the second direction are perpendicular to each other.

In some embodiments of this application, the first direction is a horizontal direction, the second direction is a vertical direction, and the horizontal direction is perpendicular to the vertical direction. The screen resolution ratio of the mobile phone is not equal to the screen resolution ratio of the television. In one case, the screen resolution ratio of the television is greater than the screen resolution ratio of the mobile phone. In another case, the screen resolution ratio of the television is less than the screen resolution ratio of the mobile phone.

For example, if the screen resolution of the television is 3840×2160, the screen resolution ratio of the television is 16:9, and if the screen resolution of the mobile phone is 2200×2480, the screen resolution ratio of the mobile phone is 7.1:8. In this case, the screen resolution ratio of the television is greater than the screen resolution ratio of the mobile phone.

For example, if the screen resolution of the television is 3840×2160, the screen resolution ratio of the television is 16:9, and if the screen resolution of the mobile phone is 2200×1100, the screen resolution ratio of the mobile phone is 2:1. In this case, the screen resolution ratio of the television is less than the screen resolution ratio of the mobile phone.

In an implementation of the first aspect, when the screen resolution ratio of the second electronic device is greater than the screen resolution ratio of the first electronic device, the adjusting the screen resolution of the first electronic device, to enable the screen resolution ratio of the first electronic device to be equal to the screen resolution ratio of the second electronic device includes:
adjusting the quantity of pixels displayed on the screen of the first electronic device in the second direction, and keeping the quantity of pixels displayed on the screen of the first electronic device in the first direction unchanged, to enable an adjusted screen resolution of the first electronic device to be:

$$a \times \left(\frac{a}{A} \times B\right),$$

where
a represents an adjusted quantity of pixels displayed on the screen of the first electronic device in the first direction, and $$\frac{a}{A} \times B$$

represents an adjusted quantity of pixels displayed on the screen of the first electronic device in the second direction.

For example, if the screen resolution of the television is 3840×2160, the screen resolution ratio of the television is 16:9, and if the screen resolution of the mobile phone is 2200×2480, the screen resolution ratio of the mobile phone is 7.1:8. According to the foregoing formula, when the screen resolution of the mobile phone is adjusted, only a quantity of pixels displayed on the screen of the mobile phone in the vertical direction needs to be adjusted to 1238. In this way, an adjusted screen resolution of the mobile phone is 2200×1238, and the screen resolution ratio of the mobile phone is 16:9 after the adjustment. This is quick and convenient.

In an implementation of the first aspect, when the screen resolution ratio of the second electronic device is less than the screen resolution ratio of the first electronic device, the adjusting the screen resolution of the first electronic device, to enable the screen resolution ratio of the first electronic device to be equal to the screen resolution ratio of the second electronic device includes:
adjusting the quantity of pixels displayed on the screen of the first electronic device in the first direction, and keeping the quantity of pixels displayed on the screen of the first electronic device in the second direction unchanged, to enable an adjusted screen resolution of the first electronic device to be:

$$\left(\frac{b}{B} \times A\right) \times b,$$

where $$\frac{b}{B} \times A$$

represents an adjusted quantity of pixels displayed on the screen of the first electronic device in the first direction, and b represents an adjusted quantity of pixels displayed on the screen of the first electronic device in the second direction.

For example, if the screen resolution of the television is 3840×2160, the screen resolution ratio of the television is 16:9, and if the screen resolution of the mobile phone is 2200×11000, the screen resolution ratio of the mobile phone is 2:1. According to the foregoing formula, when the screen resolution of the mobile phone is adjusted, only a quantity of pixels displayed on the screen of the mobile phone in the horizontal direction needs to be adjusted to 1955. In this way, an adjusted screen resolution of the mobile phone is 2200×1955, and the screen resolution ratio of the mobile phone is 16:9 after the adjustment. This is quick and convenient.

In an implementation of the first aspect, the adjusting the screen resolution of the first electronic device, to enable the screen resolution ratio of the first electronic device to be equal to the screen resolution ratio of the second electronic device further includes:
simultaneously adjusting the quantities of pixels displayed on the screen of the first electronic device in the first direction and the second direction, to enable the screen resolution ratio of the first electronic device after the adjustment to be equal to the screen resolution ratio of the second electronic device.

For example, if the screen resolution of the television is 2000×1000, the screen resolution ratio of the television is 2:1, and if the screen resolution of the mobile phone is 800×600, the screen resolution ratio of the mobile phone is 4:3. To enable the screen resolution ratio of the mobile phone to be equal to the screen resolution ratio of the television, the quantities of pixels displayed on the screen of the mobile phone in the horizontal direction and the vertical direction may be adjusted simultaneously. For example, the screen resolution of the mobile phone may be adjusted to 700×350, 600×300, 500×250, 400×200, . . . . In this case, the screen resolution ratio of the mobile phone is 2:1 after the adjustment, and the screen resolution ratio of the mobile phone after the adjustment is equal to the screen resolution ratio of the television.

In an implementation of the first aspect, the first electronic device plays a video in a first mode, and in the first mode, a resolution of the video is not equal to the screen resolution of the first electronic device.

In some embodiments of this application, a screen of the mobile phone displays a video interface, but the resolution of the video is not equal to the screen resolution of the mobile phone. In other words, although the screen of the mobile phone is playing the video, the screen of the mobile phone is not in a full-screen mode, but in a non-full-screen mode.

In an implementation of the first aspect, when the resolution of the video is not equal to the screen resolution of the first electronic device, and
  quantities of pixels displayed on the video and a screen of the first electronic device in a first direction are equal, a quantity of pixels displayed on the video in a second direction is less than a quantity of pixels displayed on the screen of the first electronic device in the second direction.

For example, if the screen resolution of the mobile phone is 2200×2480, the screen resolution ratio of the mobile phone is 7.1:8, and if the resolution of the video is 2200×1100, a resolution ratio of the video is 2:1. It can be seen that quantities of pixels displayed on the video and the screen of the mobile phone in the horizontal direction are equal, but a quantity of pixels displayed on the video in the vertical direction is less than the quantity of pixels displayed on the screen of the mobile phone in the vertical direction. That is, the video fully occupies only one direction of the screen of the mobile phone.

In an implementation of the first aspect, the method further includes:
  adjusting the screen resolution of the first electronic device, to enable the screen resolution ratio of the first electronic device to be equal to the screen resolution ratio of the second electronic device; and
  collecting the screen data of the first electronic device, and sending the screen data to the second electronic device, to display the screen content of the first electronic device on the second electronic device, where quantities of pixels displayed on the video and a screen of the second electronic device in at least one direction are equal.

For example, if the screen resolution of the television is 3480×2160, the screen resolution ratio of the television is 16:9. The screen resolution of the mobile phone is 2200×2480, and the resolution of the video is 2200×1100. The quantity of pixels displayed on the screen of the mobile phone in the vertical direction may be adjusted. For example, if an adjusted screen resolution of the mobile phone is 2200×1238, the screen resolution ratio of the mobile phone is 16:9 after the adjustment, and is consistent with the screen resolution ratio of the television. The screen resolution of the mobile phone received by the television is 2200×1238, the screen resolution of the television is 3840×2160, and both the screen resolution ratios of the mobile phone and the television are 16:9. After content displayed on the screen of the mobile phone is enlarged proportionally, the television may adjust the received screen resolution to 3840×2160, and correspondingly, adjust the resolution of the video to 3480×1740. In this case, the video fully occupies the screen of the television in the horizontal direction. This not only improves screen utilization of the television, but also improves a projection effect.

In an implementation of the first aspect, the method includes:
  adjusting the quantity of pixels displayed on the video in the second direction, to enable the quantities of pixels displayed on the video and the screen of the first electronic device in the second direction to be equal; and
  collecting the screen data of the first electronic device, and sending the screen data to the second electronic device, to display the screen content of the first electronic device on the second electronic device, where quantities of pixels displayed on the video and a screen of the second electronic device in at least one direction are equal.

For example, if the screen resolution of the television is 3840×2160, the screen resolution ratio of the television is 16:9, if the screen resolution of the mobile phone is 2200×2480, the screen resolution ratio of the mobile phone is 7.1:8, and if the resolution of the video is 2200×1100, the resolution ratio of the video is 2:1. It is clear that, the resolution ratio of the video is inconsistent with the screen resolution ratio of the mobile phone. However, the quantity (2480) of pixels displayed on the screen of the mobile phone in the vertical direction is greater than a quantity (2160) of pixels displayed on the screen of the television in the vertical direction. Therefore, after screen mirroring, the screen of the mobile phone may fully occupy the screen of the television in the vertical direction.

In some embodiments of this application, the mobile phone may adjust the quantity of pixels displayed on the video in the vertical direction, to enable the quantity of pixels displayed on the video in the vertical direction to be equal to the quantity of pixels displayed on the screen of the mobile phone in the vertical direction.

For example, if the mobile phone adjusts the quantity of pixels displayed on the video in the vertical direction from 1100 to 2480, the video fully occupies the entire screen of the mobile phone. Then, the screen resolution of the mobile phone received by the television is 2200×2480, the screen resolution of the television is 3840×2160, and the resolution of the video is also 2200×2480. In this case, the video fully occupies the screen of the television in the vertical direction. This not only improves screen utilization of the television, but also improves a projection effect.

According to a second aspect, an electronic device is provided, and includes:
  a screen;
  a memory, where the memory stores instructions; and
  a processor, where the processor is coupled to the memory, and when the program instructions stored in the memory are executed by the processor, the electronic device is enabled to control the screen to perform the projection method according to the first aspect.

According to a third aspect, a readable medium is provided, where the readable medium stores instructions, and when the instructions are run on the readable medium, the readable medium is enabled to perform the projection method according to the first aspect.

DESCRIPTION OF EMBODIMENTS

The following further describes in detail the technical solutions in embodiments of this application with reference to the accompanying drawings and embodiments. It may be understood that the specific embodiments described herein are merely used to explain embodiments of this application, but are not intended to limit embodiments of this application. In addition, it should be noted that, for ease of description, only a part but not all of a structure related to embodiments of this application is shown in the accompanying drawings.

Figure 1:
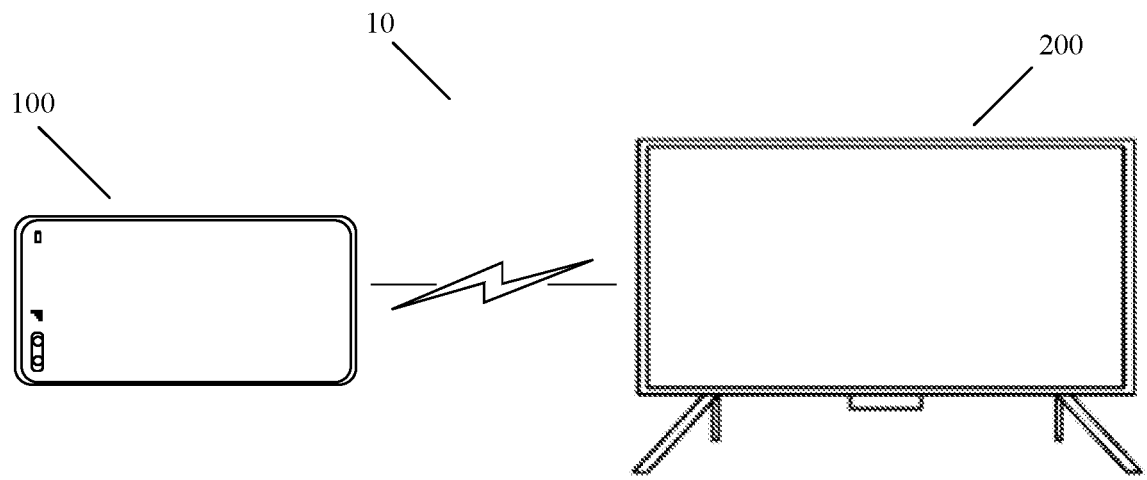
FIG. 1 is a diagram of a projection application scenario according to an embodiment of this application.

FIG. 1 shows a projection application scenario 10 according to an embodiment of this application. As shown in FIG. 1, the projection application scenario 10 includes a mobile phone 100 and a television 200. The mobile phone 100 is used as a projection source end, and the television 200 is used as a projection receiving end. The mobile phone 100 mirrors, to the television 200 according to a projection protocol, content displayed on a screen of the mobile phone 100. The mirrored content may be a picture, audio, a video, or the like.

For ease of description, the following describes the technical solutions in embodiments of this application by using an example in which the projection source end is the mobile phone 100 and the projection receiving end is the television 200. In an example scenario, the mobile phone 100 plays a video in full screen. In this case, a user needs to mirror a screen interface of the mobile phone 100 to a screen of the television 200. If a screen resolution ratio of the mobile phone 100 is inconsistent with a screen resolution ratio of the television 200, direct screen mirroring is performed on the screen interface of the mobile phone 100, and the screen interface can only be projected to the middle of the screen of the television 200. As a result, black borders appear around the screen of the television 200. According to a projection method in embodiments of this application, before the mobile phone 100 is mirrored to the television 200, the screen resolution ratio of the television 200 is first obtained, and then the screen resolution ratio of the mobile phone 100 is correspondingly adjusted, to enable the screen resolution ratio of the mobile phone 100 to be consistent with the screen resolution ratio of the television 200. Then, the screen interface of the mobile phone 100 is mirrored to the screen of the television 200. The television 200 may scale the screen interface of the mobile phone 100 proportionally, to enable the screen interface of the mobile phone 100 to fully cover the screen of the television 200. Therefore, in the projection method in embodiments of this application, when a screen resolution ratio of a projection source end is inconsistent with a screen resolution ratio of a projection receiving end, a screen resolution of the projection source end is adjusted, to enable the screen resolution ratios of the two ends to be consistent. Finally, a screen of the projection receiving end can be fully covered after screen mirroring. This not only improves screen utilization of the projection receiving end, but also achieves a better projection display effect and improves user projection experience.

It should be noted that the projection protocol may be a Miracast protocol, an AirPlay protocol, a DLNA (Digital Living Network Alliance) protocol, or the like. This is not limited herein. The following describes in detail a projection technical solution of mirroring the mobile phone 100 to the television 200 according to the Miracast protocol.

It should be understood that, in this embodiment of this application, the mobile phone 100 is an instance of an electronic device used as the projection source end. The electronic device used as the projection source end in this embodiment of this application includes but is not limited to a smart device having a projection function, like a mobile phone, a tablet computer, a notebook computer, a desktop computer, a vehicle-mounted electronic device, a palmtop computer, or a personal digital assistant (PDA). In addition, it should be understood that, in this embodiment of this application, the television 200 is an instance of an electronic device used as the projection receiving end. The electronic device used as the projection receiving end in this embodiment of this application may be but is not limited to an electronic display device like a smart television, a smart screen, a smart set-top box, a smartphone, a tablet computer, a desktop computer, a vehicle-mounted computer, or a projector.

Figure 2:
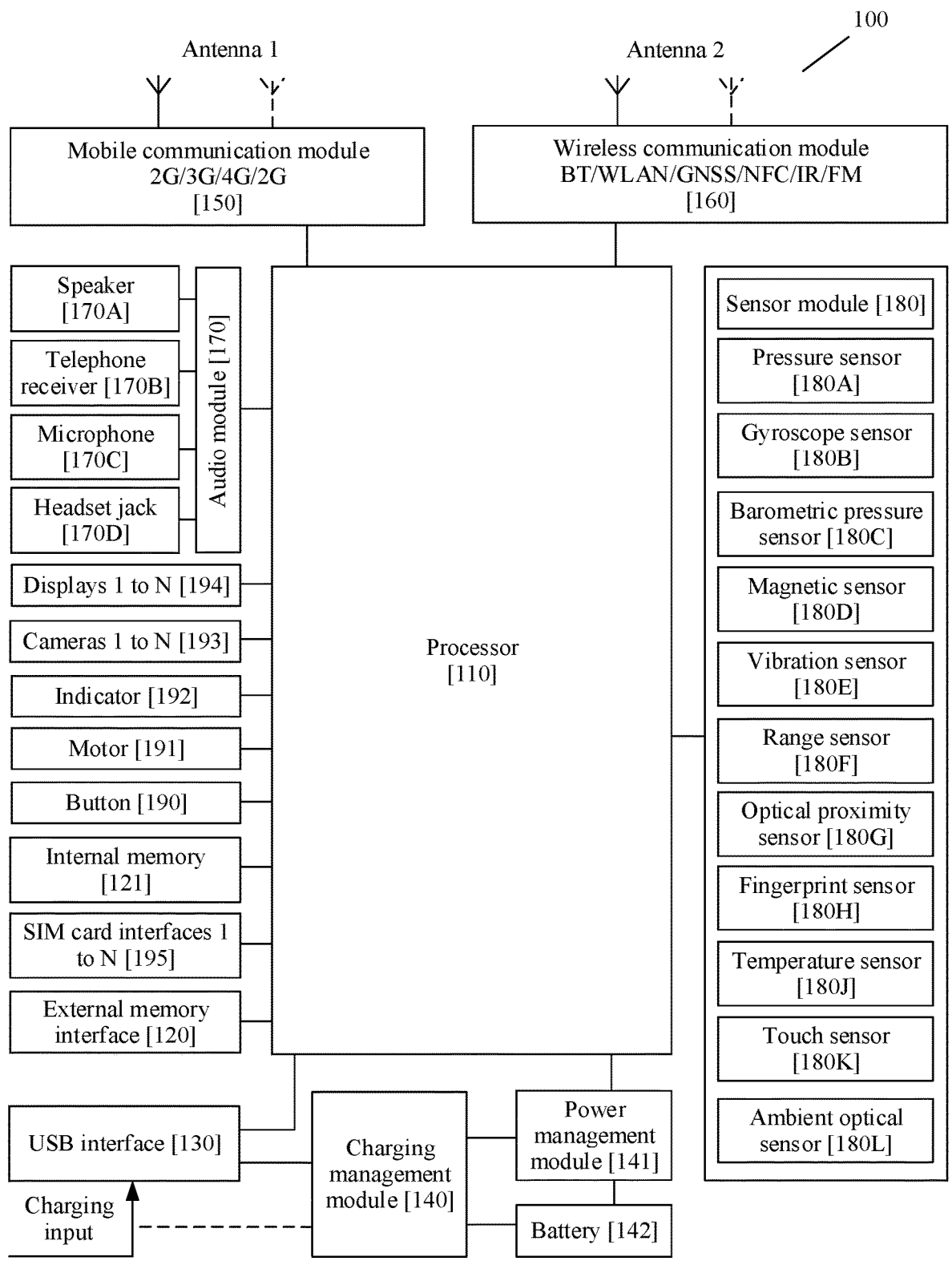
FIG. 2 is a block diagram of a structure of a mobile phone 100 that can implement a function of a mobile phone 100 shown in FIG. 1 according to an embodiment of this application.

FIG. 2 is a block diagram of a structure of a mobile phone 100 that can implement a function of the mobile phone 100 shown in FIG. 1 according to an embodiment of this application. Specifically, as shown in FIG. 2, the mobile phone 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 198, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 100. In some other embodiments of this application, the mobile phone 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from a charger. The power management module 148 is configured to connect to the battery 142, the charging management module 140, and the processor 180. The power management module 148 receives an input of the battery 142 and/or the charging management module 140, and supplies power to the processor 180, the internal memory 121, the display 194, the camera 193, the wireless communication module 160, and the like. The power management module 148 may be further configured to monitor parameters such as a battery capacity, a quantity of battery cycles, and a battery health status (electric leakage or impedance). In some other embodiments, the power management module 141 may alternatively be disposed in the processor 180. In some other embodiments, the power management module 141 and the charging management module 140 may alternatively be disposed in a same component.

A wireless communication function of the mobile phone 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch. In some embodiments, the antenna 1 and the antenna 2 can support frequencies of an ultra-wideband frequency band in an ultra-wideband mode, for example, 6.5 GHz (or another value in the ultra-wideband frequency band like 6.0 to 9.0 GHz).

The mobile communication module 150 may provide a solution, applied to the mobile phone 100, to wireless communication including 2G, 3G, 4G, 5G, and the like. The wireless communication module 160 may provide a solution, applied to the mobile phone 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processing module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. In some embodiments, the mobile communication module 150 can support a 5G millimeter wave protocol, so that the mobile phone 100 can implement ultra-wideband transmission according to the 5G millimeter wave protocol. In addition, in some embodiments, the wireless communication module 160 can implement the foregoing multi-carrier technology based on the communication protocol of the Wi-Fi network, so that the mobile phone 100 can implement ultra-wideband transmission according to an existing Wi-Fi protocol.

In some embodiments, in the mobile phone 100, the antenna 1 and the mobile communication module 150 are coupled, and the antenna 2 and the wireless communication module 160 are coupled, so that the mobile phone 100 can communicate with a network and another device by using a wireless communication technology.

The mobile phone 100 implements a display function by using the GPU, the display 194, the application processor, and the like. The GPU is a microprocessor for image processing, and is connected to the display 194 and the application processor. The GPU is configured to: perform mathematical and geometric computation, and render images. The processor 110 may include one or more GPUs, which execute program instructions to generate or change display information.

The mobile phone 100 may implement a photographing function by using the ISP, the camera 193, the video codec, the GPU, the display 194, the application processor, and the like. In some embodiments of this application, the display 194 is configured to implement human-machine interaction with a user.

The external memory interface 120 may be used to connect to an external storage card, for example, a Micro SD card, to extend a storage capability of the mobile phone 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playback function or an image playback function), and the like. The data storage area may store data (such as audio data and an address book) and the like created during use of the mobile phone 100. In addition, the internal memory 121 may include a high-speed random access memory, and may further include a nonvolatile memory, for example, at least one magnetic disk storage device, a flash storage device, or a universal flash storage (universal flash storage, UFS). In some embodiments of this application, the processor 110 runs the instructions stored in the internal memory 121 and/or the instructions stored in the memory that is disposed in the processor, so that the mobile phone 100 performs the projection method provided in embodiments of this application, various functional applications, and data processing.

The mobile phone 100 may implement an audio function, for example, music playing and recording, through the audio module 170, the speaker 170A, the telephone receiver 170B, the microphone 170C, the headset jack 170D, the application processor, and the like.

Figure 3:
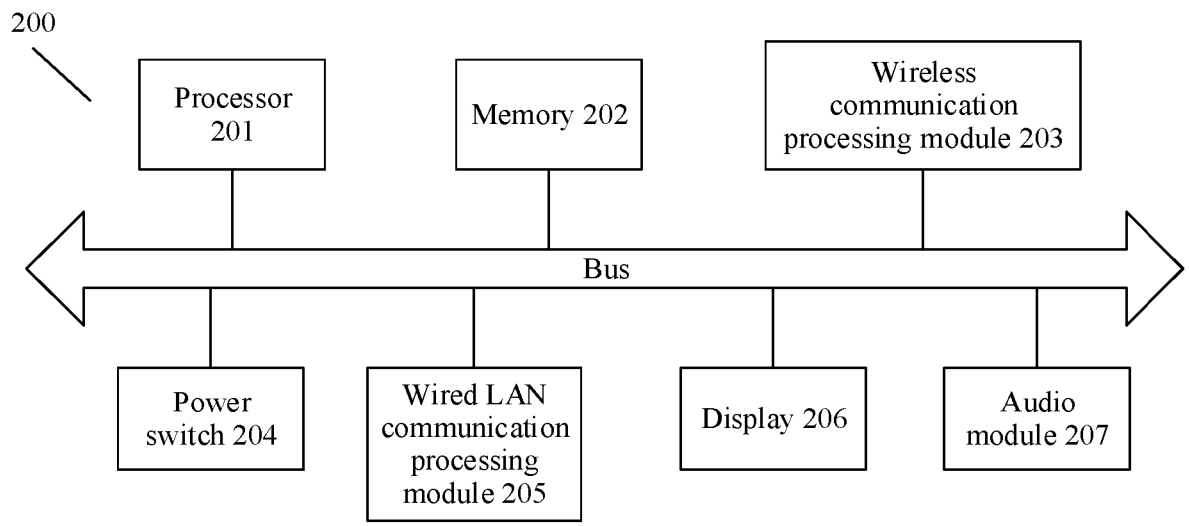
FIG. 3 is a block diagram of a structure of a television 200 that can implement a function of a television 200 shown in FIG. 1 according to an embodiment of this application.

FIG. 3 is a block diagram of a structure of a television 200 that can implement a function of the television 200 shown in FIG. 1 according to an embodiment of this application. Specifically, as shown in FIG. 3, the television 200 may include a processor 201, a memory 202, a wireless communication processing module 203, a power switch 204, a wired LAN communication processing module 205, a display 206, and an audio module 207. The processor 201 may be configured to read and execute computer-readable instructions.

During specific implementation, the processor 201 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for storing a quantity of register operations, intermediate operation results, and the like that are temporarily stored during instruction execution. During specific implementation, a hardware architecture of the processor 201 may be an application-specific integrated circuit (ASIC) architecture, an MIPS architecture, an ARM architecture, an NP architecture, or the like.

In some embodiments, the processor 201 may be configured to parse a signal received by the wireless communication processing module 203 or the wired LAN communication processing module 205, for example, a projection instruction sent by a mobile phone 100. The processor 201 may be configured to perform a corresponding processing operation based on a parsing result, for example, send a broadcast signal to the mobile phone 100, where the broadcast signal includes a screen resolution of the television 200.

The memory 202 is coupled to the processor 201, and is configured to store various software programs and/or a plurality of groups of instructions. During specific implementation, the memory 202 may include a high-speed random access memory, and may also include a nonvolatile memory like one or more disk storage devices, a flash device, or another nonvolatile solid-state storage device. The memory 202 may store an operating system, for example, an embedded operating system like uCOS, VxWorks, or RTLinux. The memory 202 may further store a communication program, and the communication program may be used to communicate with the mobile phone 100, one or more servers, or an additional device.

The wireless communication processing module 203 may further include a cellular mobile communication processing module (not shown). The cellular mobile communication processing module may communicate with another device (for example, a server) by using a cellular mobile communication technology.

The power switch 204 may be configured to control a power supply to supply power to components of the television 200.

The wired LAN communication processing module 205 may be configured to communicate with another device in a same LAN by using a wired LAN, or may be configured to connect to a WAN by using the wired LAN and communicate with a device in the WAN.

The display 206 may be configured to display images, videos, and the like. The display 206 may be a liquid crystal display (LCD), an organic light-emitting diode (OLED) display, an active-matrix organic light emitting diode (AMOLED) display, a flexible light-emitting diode (FLED) display, a quantum dot light emitting diode (QLED) display, or the like.

The audio module 210 may be configured to output an audio signal through an audio output interface, so that the television 200 can support audio playback. The audio module may be further configured to receive audio data through an audio input interface. The audio module 207 includes but is not limited to a microphone, a speaker, a telephone receiver, and the like.

It may be understood that the structure shown in FIG. 3 does not constitute a specific limitation on the television 200. In some other embodiments of this application, the television 200 may include more or fewer components than those shown in the figure, combine some components, split some components, or have different component arrangements. The components shown in the figure may be implemented by hardware, software, or a combination of software and hardware.

Figure 4:
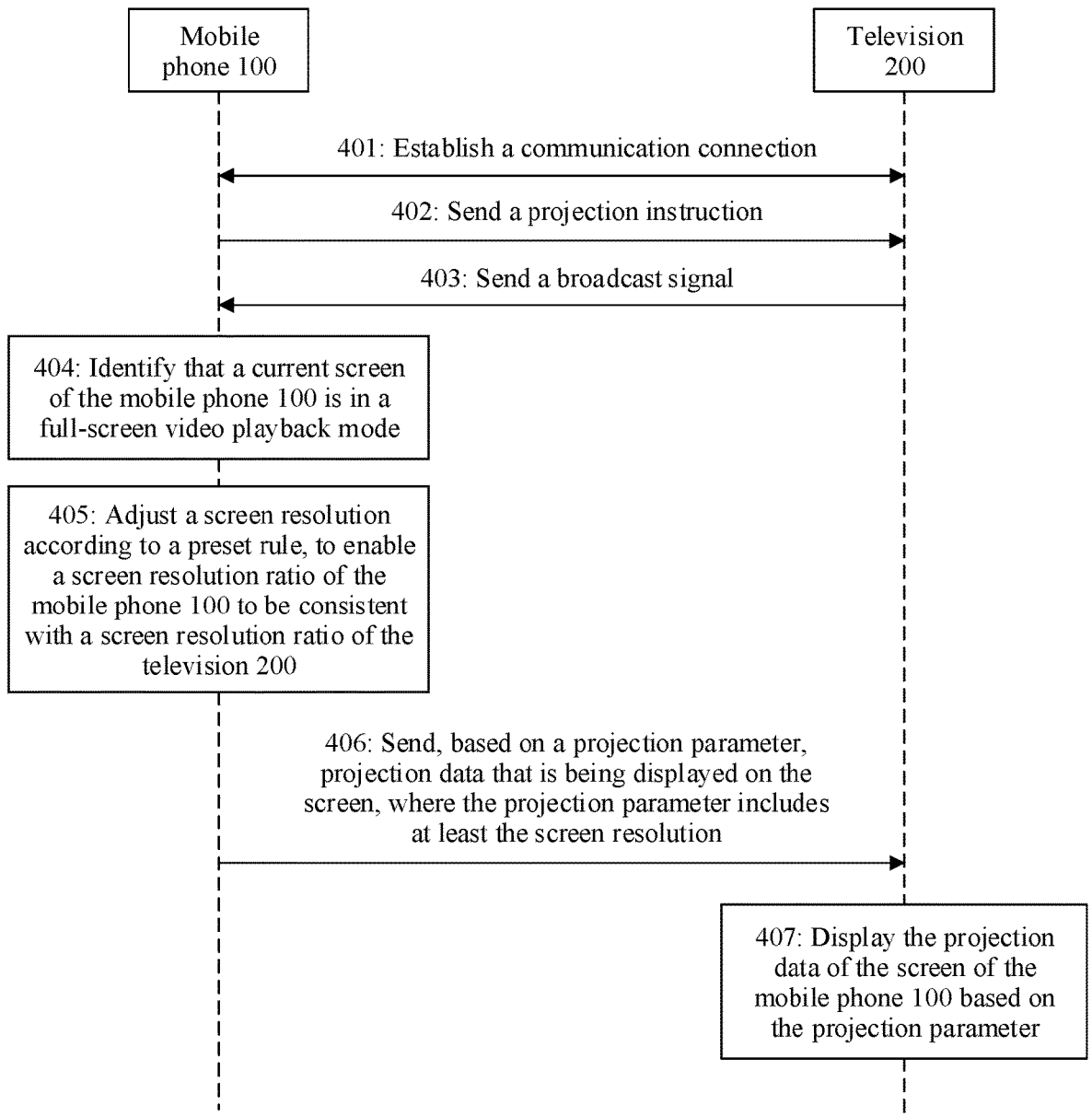
FIG. 4 is a flowchart of a method for mirroring a mobile phone 100 to a television 200 according to an embodiment of this application.

According to some embodiments of this application, the following specifically describes the technical solutions of this application with reference to FIG. 4. FIG. 4 is a flowchart of a method for mirroring a mobile phone 100 to a television 200. As shown in FIG. 4, the method for mirroring the mobile phone 100 to the television 200 includes the following steps.

401: The mobile phone 100 establishes a communication connection to the television 200.

In some embodiments of this application, the mobile phone 100 may establish the communication connection to the television 200 in a wireless manner. For example, the wireless manner may be Bluetooth, Wi-Fi, or a WLAN direct connection.

The following uses an example in which the mobile phone 100 establishes a Wi-Fi connection to the television 200. A user may enable Wi-Fi functions of the mobile phone 100 and the television 200 and connect the mobile phone 100 and the television 200 to a same Wi-Fi network. If the user wants to project, to a screen of the television 200 for display, content displayed on a screen of the mobile phone 100, the user may enable a projection function of the mobile phone 100. As shown in FIG. 4, the mobile phone 100 may display, on an interface 101, a list of found devices that are connected to a same Wi-Fi network. For example, a device list 102 includes an identifier 103 of the television 200. If it is detected that the user selects the identifier 103 in the device list 102, the mobile phone 100 may establish the Wi-Fi connection to the television 200 by using a Wi-Fi direct function.

In some other embodiments of this application, the mobile phone 100 may establish the communication connection to the television 200 in a wired manner. For example, the wired manner may be a USB data cable or a dock interface.

402: The mobile phone 100 sends a projection instruction to the television 200.

Figure 5:
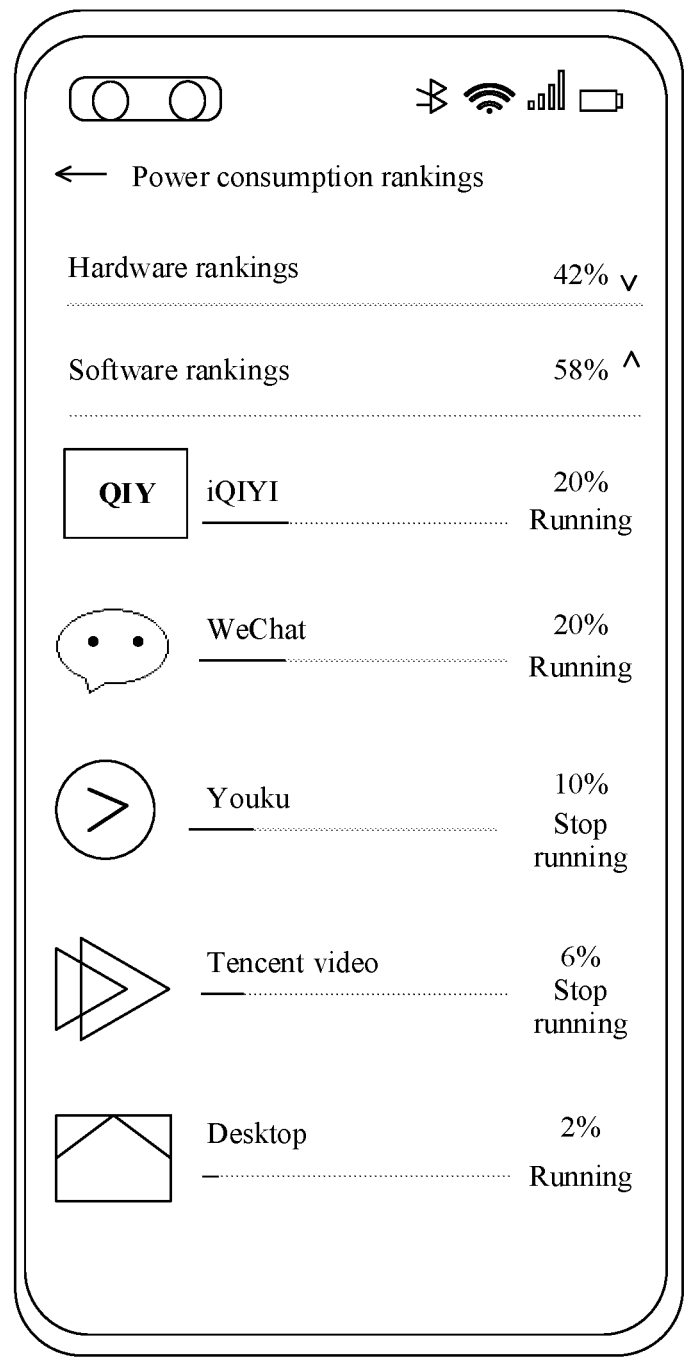
FIG. 5 is a diagram of a display interface of a screen of a mobile phone 100 according to an embodiment of this application.

For example, as shown in FIG. 5, it may be determined, by identifying whether a video-type APP (application) is running in a foreground of the mobile phone 100, whether an interface of a current screen is a video interface. For example, the video-type APP may be iQIYI™, Youku™, or Tencent video™.

For example, when detecting that the iQIYI APP is running, the mobile phone 100 may determine that the display interface of the current screen is in a video playback mode.

Figure 6:
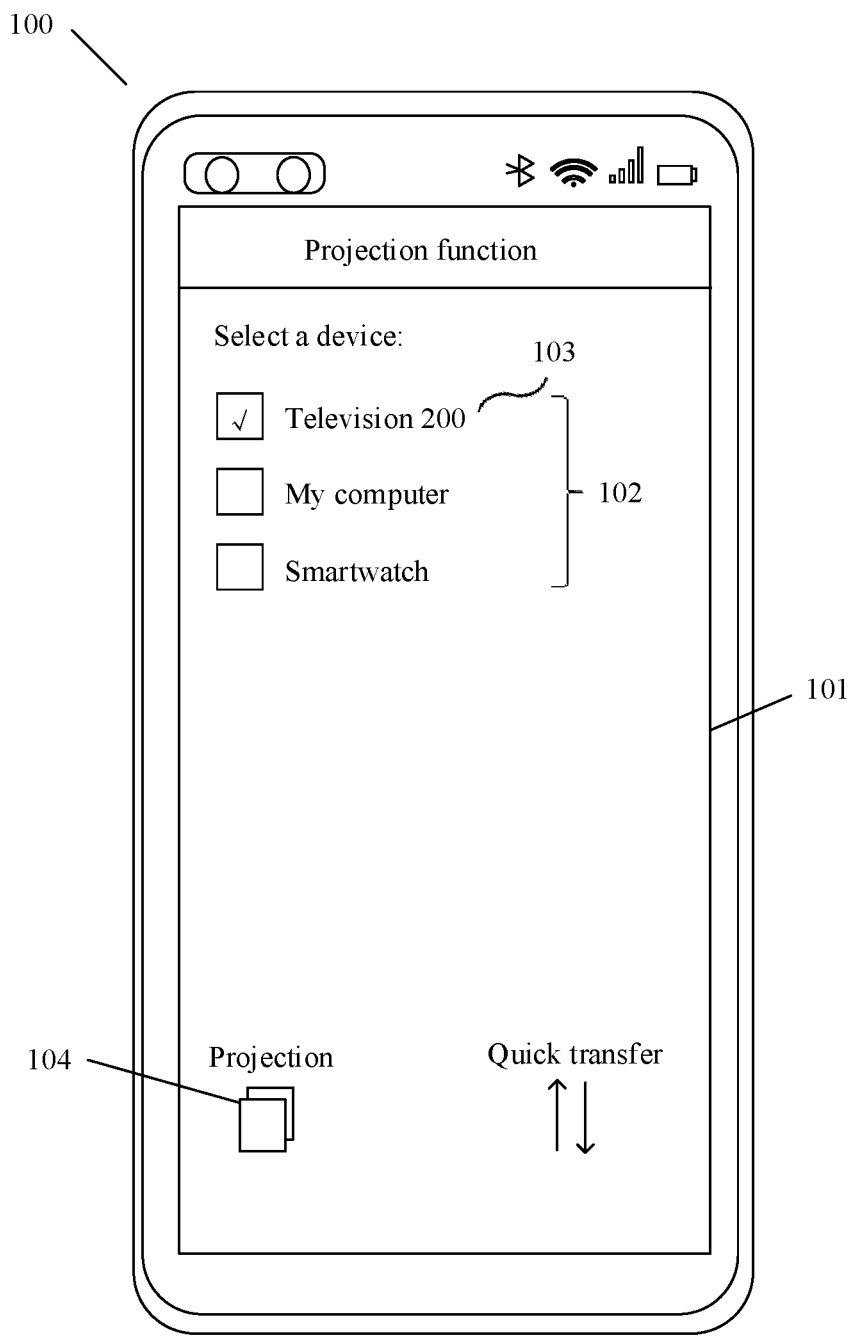
FIG. 6 is a diagram of a display interface of a screen of a mobile phone 100 according to an embodiment of this application.

As shown in FIG. 6, when the video-type APP (application) is running, the interface 101 displayed by the mobile phone 100 may further include a projection option 104. If the mobile phone 100 detects that the user taps the projection option 104 after selecting the identifier 103 of the television 200, the mobile phone 100 may be used as a projection source end to send the projection instruction to a projection receiving end, namely, the television 200, selected by the user. For example, the projection instruction may include an identifier of the mobile phone 100. After receiving the projection instruction, the television 200 may determine that the projection source end of subsequent projection is the mobile phone 100.

In some other embodiments of this application, for example, the projection option 104 in FIG. 6 may alternatively be displayed by directly choosing from a system menu of the mobile phone 100 without intervention of the video-type APP. In this case, the content displayed on the screen of the mobile phone 100 may also be mirrored to the television 200. An interface of the system menu is similar to that in FIG. 6. Details are not described herein.

It may be understood that the user may set the television 200 as a projection receiving end. In this case, the mobile phone 100 is a projection source end of the television 200. Alternatively, the user may set the television 200 as a projection source end. In this case, the mobile phone 100 is a projection receiving end of the television 200. This embodiment of this application does not constitute any limitation on this.

403: The television 200 sends a broadcast signal to the mobile phone 100 in response to the projection instruction of the mobile phone 100, where the broadcast signal includes a current screen resolution of the television 200.

The screen resolution is a resolution of a screen of a computer device during screen displaying, and the screen resolution may be understood as a quantity of pixels displayed on the screen. For example, if the screen resolution is 1920×1080, it indicates that 1920 pixels are displayed on the screen in a horizontal direction and 1080 pixels are displayed on the screen in a vertical direction. Because a quantity of pixels in the horizontal direction and a quantity of pixels in the vertical direction are not unique, a screen resolution ratio is not unique either. The screen resolution ratio is a ratio of the quantity of pixels in the horizontal direction to the quantity of pixels in the vertical direction. For example, when the screen resolution is 1920×1080, a screen resolution ratio is 1920:1080=16:9.

404: The mobile phone 100 identifies that the current screen of the mobile phone 100 is in a full-screen video playback mode.

The mobile phone 100 determines whether a resolution of a video-type APP window is equal to a screen resolution of the mobile phone 100. If the resolution of the video-type APP window is equal to the screen resolution, the current screen plays a video in full screen.

405: The mobile phone 100 adjusts the screen resolution of the mobile phone 100 according to a preset rule, to enable a screen resolution ratio of the mobile phone 100 to be consistent with a screen resolution ratio of the television 200.

In some embodiments of this application, the screen resolution of the mobile phone 100 is a×b, and the screen resolution of the television 200 is A×B, where a and A respectively represent quantities of pixels displayed on the screens of the mobile phone 100 and the television 200 in the horizontal direction, and b and B respectively represent quantities of pixels displayed on the screens of the mobile phone 100 and the television 200 in the vertical direction. When the screen resolution ratio of the mobile phone 100 is inconsistent with the screen resolution ratio of the television 200, the quantity of pixels displayed on the screen of the mobile phone 100 in the horizontal direction or the vertical direction may be adjusted according to the preset rule, to enable the screen resolution ratios of the mobile phone 100 and the television 200 to be consistent. Details are as follows:

(1) The screen resolution ratio of the television 200 is greater than the screen resolution ratio of the mobile phone 100, that is, $$\frac{A}{B} > \frac{a}{b}. \quad (1)$$

In this case, the quantity of pixels displayed on the screen of the mobile phone 100 in the vertical direction may be adjusted, and the quantity of pixels in the horizontal direction keeps unchanged. An adjusted screen resolution of the mobile phone 100 is:

$$a \times \left(\frac{a}{A} \times B\right). \quad (2)$$

A quantity of pixels of the adjusted screen resolution of the mobile phone 100 in the horizontal direction is a, and a quantity of pixels in the vertical direction is $$\frac{a}{A} \times B.$$

Figure 7A:
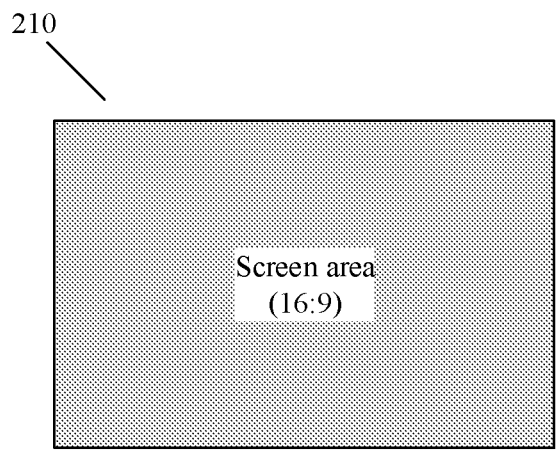
FIG. 7a is a schematic diagram of a screen resolution of a television 200 according to an embodiment of this application.
Figure 7B:
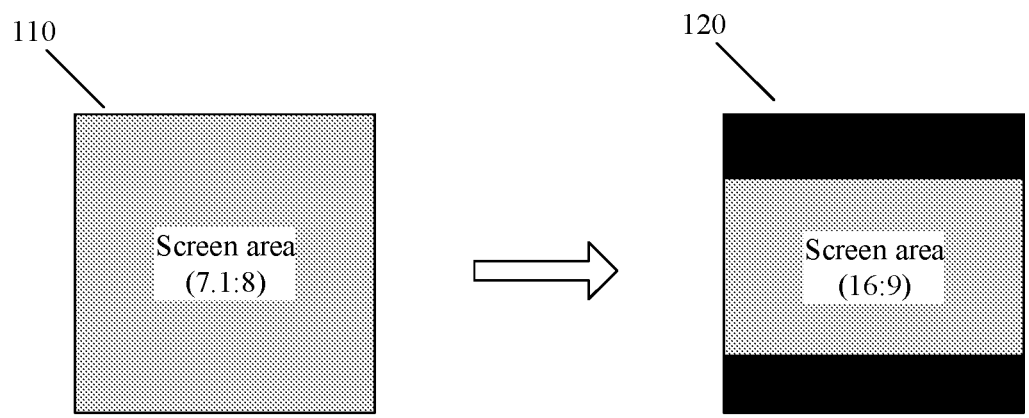
FIG. 7b is a schematic diagram of adjusting a screen resolution of a mobile phone 100 according to an embodiment of this application.

For example, as shown in FIG. 7a, if a resolution of a screen 210 of the television 200 is 3840×2160, a screen resolution ratio of the television 200 is 16:9. As shown in FIG. 7b, if an image 110 is a screen of the mobile phone 100, and a screen resolution is 2200×2480, a screen resolution ratio of the screen 110 of the mobile phone 100 is 7.1:8. According to formula (1), the screen resolution ratio of the mobile phone 100 is less than the screen resolution ratio of the television 200. According to formula (2), the quantity of pixels of the screen resolution of the mobile phone 100 in the horizontal direction keeps unchanged, and the quantity of pixels in the vertical direction is adjusted to $$\frac{2200}{3840} \times 2160 = 1238.$$

An image 120 is a screen of the mobile phone 100 after the adjustment, and a screen resolution is 2200×1238. It can be learned that a screen resolution ratio of the screen 120 of the mobile phone 100 is also 16:9 after the adjustment, and is consistent with the screen resolution ratio of the screen 210 of the television 200.

(2) The screen resolution ratio of the television 200 is less than the screen resolution ratio of the mobile phone 100, that is, $$\frac{A}{B} < \frac{a}{b}. \quad (3)$$

In this case, the quantity of pixels displayed on the screen of the mobile phone 100 in the horizontal direction may be adjusted, and the quantity of pixels in the vertical direction keeps unchanged. An adjusted screen resolution of the mobile phone 100 is:

$$\left(\frac{b}{B} \times A\right) \times b. \quad (4)$$

A quantity of pixels of the adjusted screen resolution of the mobile phone 100 in the horizontal direction is $$\frac{b}{B} \times A,$$

and a quantity of pixels in the vertical direction is b.

Figure 7C:
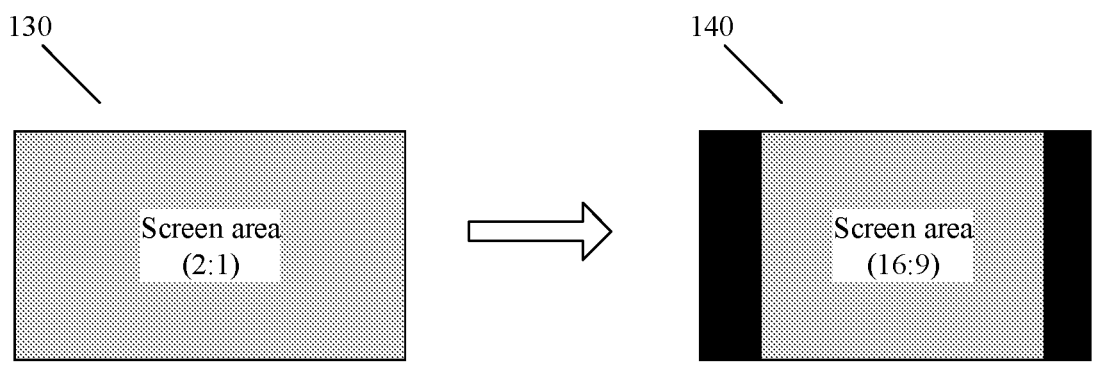
FIG. 7c is a schematic diagram of adjusting a screen resolution of a mobile phone 100 according to an embodiment of this application.

For example, go back to FIG. 7a. If a resolution of a screen 210 of the television 200 is 3840×2160, a screen resolution ratio of the television 200 is 16:9. As shown in FIG. 7c, if an image 130 is a screen of the mobile phone 100, and a screen resolution is 2200×1100, a screen resolution ratio of the screen 130 of the mobile phone 100 is 2:1. According to formula (3), the screen resolution ratio of the mobile phone 100 is greater than the screen resolution ratio of the television 200. According to formula (4), the quantity of pixels of the screen resolution of the mobile phone 100 in the vertical direction keeps unchanged, and the quantity of pixels in the horizontal direction is adjusted to $$\frac{1100}{2160} \times 3840 = 1955.$$

An image 140 is a screen of the mobile phone 100 after the adjustment, and a screen resolution is 1955×1100. It can be learned that a screen resolution ratio of the screen 140 of the mobile phone 100 is also 16:9 after the adjustment, and is consistent with the screen resolution ratio of the screen 210 of the television 200.

406: The mobile phone 100 sends, to the television 200 based on a projection parameter, projection data that is being displayed on the screen of the mobile phone 100, where the projection parameter includes at least the adjusted screen resolution of the mobile phone 100.

In some embodiments of this application, the projection parameter includes at least the screen resolution of the mobile phone 100, and may further include a coding compression rate, a transmission bit rate, a frame rate, and the like.

For example, the screen resolution is used as an example. When the mobile phone 100 is mirrored to the television 200, each frame of display interface of the mobile phone 100 may be sent to the television 200 for display in a form of a picture. For example, if the screen resolution of the mobile phone 100 is 2200×1238, the mobile phone 100 may send each frame of picture based on the screen resolution of 2200×1238. For example, if the screen resolution of the mobile phone 100 is 1955×1100, the mobile phone 100 may send each frame of picture based on the screen resolution of 1955×1100.

For example, the coding compression rate is used as an example. To reduce a data transmission amount during screen mirroring, when sending, to the television 200, the projection data that needs to be projected for display, the mobile phone 100 uses a specific codec protocol to code and compress the projection data. For example, the codec protocol may be H.263, H.264, or H.265. In the stipulation of the H.264 codec protocol, when coding data streams of all frames of display interfaces, the mobile phone 100 may sequentially code the data streams into a plurality of I frames and a plurality of P frames. The I frame is also referred to as an intra coded picture, is an independent frame that carries all information, and can be independently coded without referring to another image. The P frame is also referred to as a predictive coded picture, and can be coded only by referring to the foregoing I frame. The P frame indicates a difference between a current frame interface and a previous frame interface.

The mobile phone 100 may code the display interface of the current screen based on the adjusted screen resolution and the coding compression rate, and send a coded data stream to the television 200.

407: The television 200 displays the received projection data of the mobile phone 100 based on the projection parameter.

After receiving the projection data sent by the mobile phone 100, the television 200 decodes and displays the received data based on the projection parameter. The television 200 may restore the screen interface of the mobile phone 100 by using a decoding manner corresponding to the coding compression rate in the projection parameter. For example, when the codec protocol in the projection parameter is H.264, the television decodes the received projection data by using the codec protocol H.264.

In addition, the screen resolution in the projection parameter is scaled proportionally, so that the received display interface covers the screen of the television 200.

Figure 7D:
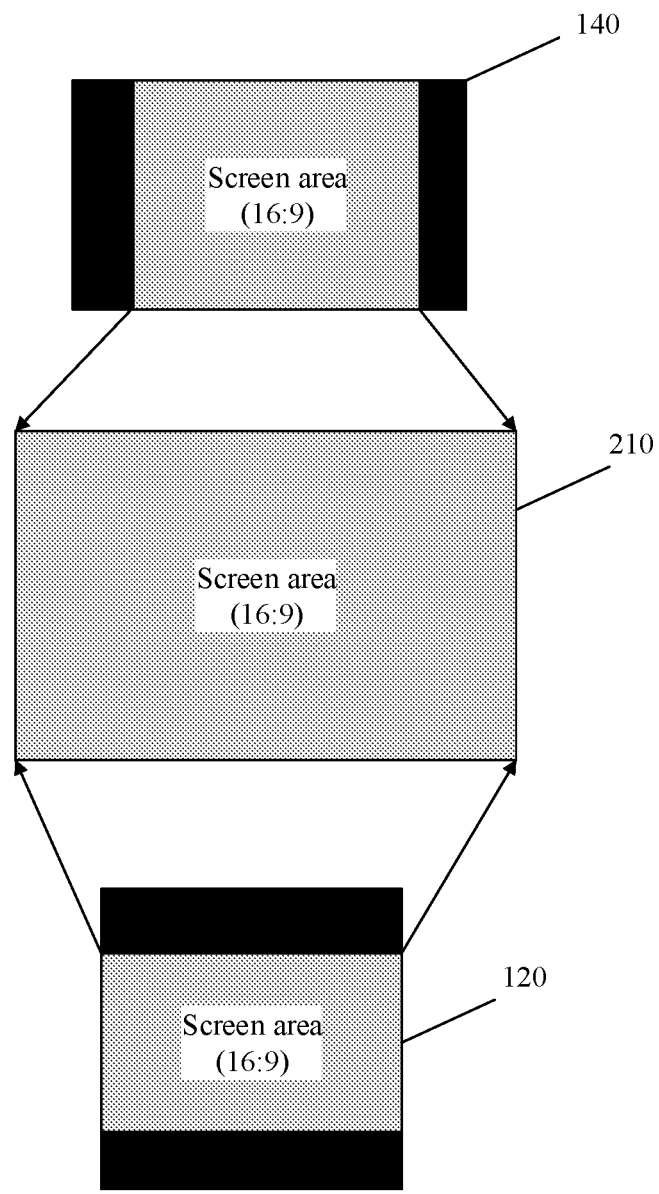
FIG. 7d is a schematic diagram of mirroring a mobile phone 100 to a television 200 according to an embodiment of this application.

For example, as shown in FIG. 7d, a resolution of a screen 120 of the mobile phone 100 is 2200×1238, a resolution of a screen 210 of the television 200 is 3840×2160, both screen resolution ratios of the mobile phone 100 and the television 200 are 16:9, and a screen resolution received by the television 200 is 2200×1238. After content displayed on the screen of the mobile phone is enlarged proportionally, the received screen resolution may be adjusted to 3840×2160. In this case, a screen area of the mobile phone 100 may fully cover the screen of the television 200. Similarly, a resolution of a screen 120 of the mobile phone 100 is 1955×1100, both resolution ratios of a screen 140 and a screen 210 are 16:9, and a screen resolution received by the television 200 is 1955×1100. After content displayed on the screen of the mobile phone is enlarged proportionally, the received screen resolution may be adjusted to 3840×2160. In this case, a screen area of the mobile phone 100 may also fully cover the screen of the television 200.

As described in the foregoing embodiment, the mobile phone 100 adjusts the screen resolution according to the preset rule. To be specific, the mobile phone 100 adjusts the quantity of pixels displayed on the screen in the horizontal direction or the vertical direction, to enable the screen resolution ratio of the mobile phone 100 to be consistent with the screen resolution ratio of the television 200. In this way, the screen area of the mobile phone 100 after screen mirroring fully covers the screen of the television 200. This is quick and simple.

Figure 8:
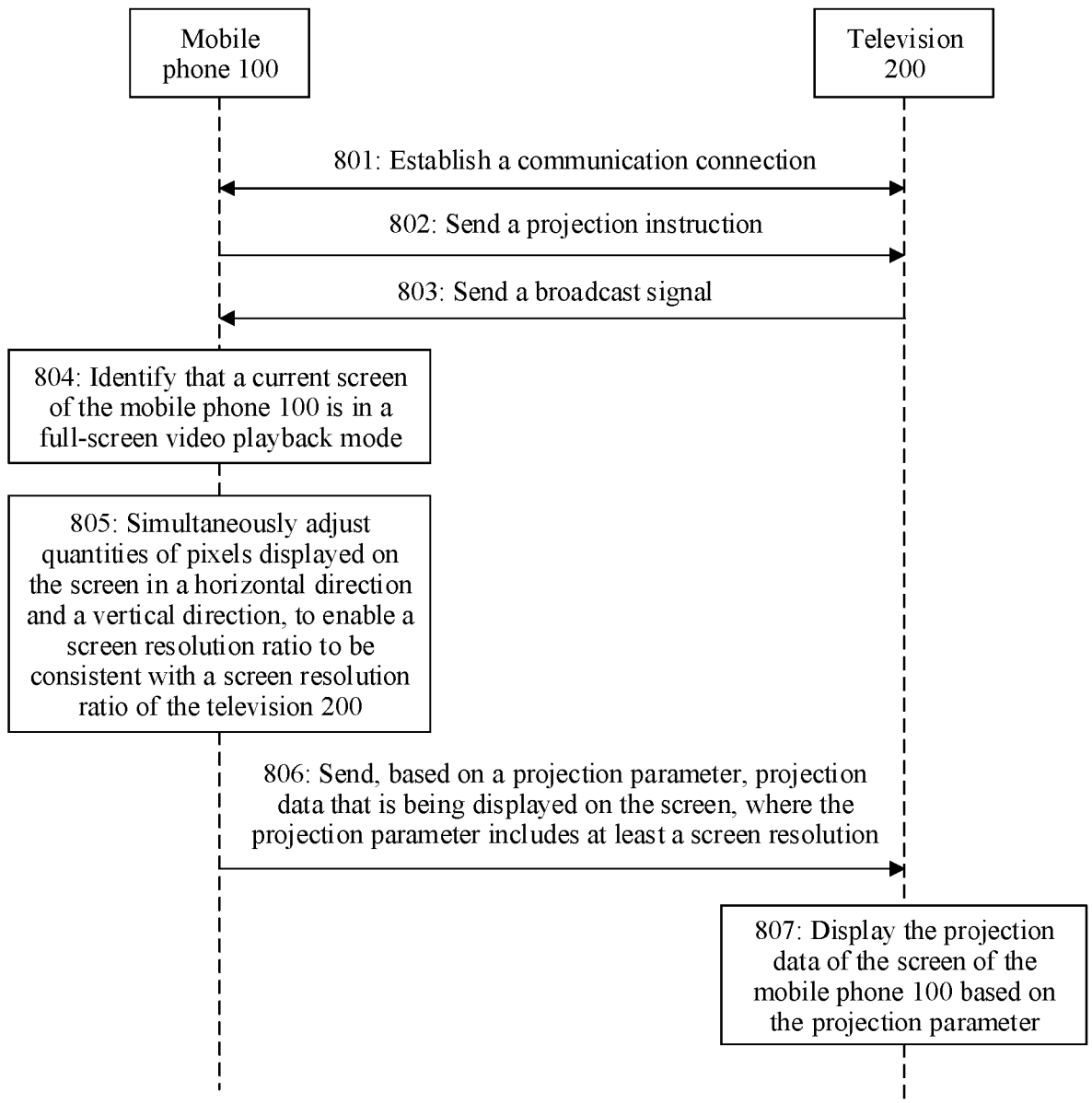
FIG. 8 is a flowchart of a method for mirroring a mobile phone 100 to a television 200 according to an embodiment of this application.

In some other embodiments of this application, the screen resolution of the mobile phone 100 may not be adjusted according to the preset rule, and the quantities of pixels displayed on the screen of the mobile phone 100 in the horizontal direction and the vertical direction may be simultaneously adjusted, to enable the screen resolution ratio of the mobile phone 100 to be consistent with the screen resolution ratio of the television 200. The following specifically describes the technical solutions of this application with reference to FIG. 8. As shown in FIG. 8, the specific solutions are as follows:

801: A mobile phone 100 establishes a communication connection to a television 200. For a specific process, refer to the descriptions of 401 in FIG. 4.

802: The mobile phone 100 sends a projection instruction to the television 200. For a specific process, refer to the descriptions of 402 in FIG. 4.

803: The television 200 sends a broadcast signal to the mobile phone 100 in response to the projection instruction of the mobile phone 100, where the broadcast signal includes a current screen resolution of the television 200. For a specific process, refer to the descriptions of 403 in FIG. 4.

804: The mobile phone 100 identifies that a current screen of the mobile phone 100 is in a full-screen video playback mode. For a specific process, refer to the descriptions of 404 in FIG. 4.

805: The mobile phone 100 simultaneously adjusts quantities of pixels displayed on the screen in a horizontal direction and a vertical direction, to enable a screen resolution ratio to be consistent with a screen resolution ratio of the television 200.

Figure 9:
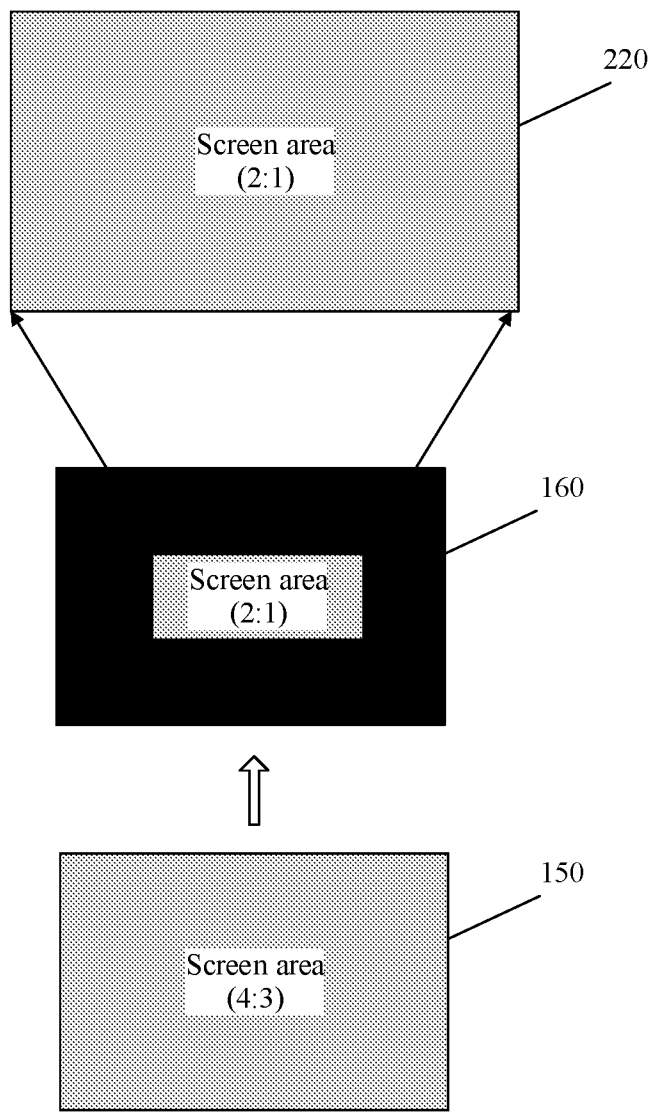
FIG. 9 is a schematic diagram of adjusting a screen resolution of a mobile phone 100 according to an embodiment of this application.

For example, as shown in FIG. 9, if a resolution of a screen 220 of the television 200 is 2000×1000, a resolution ratio of the screen 220 of the television 200 is 2:1, and if a resolution of a screen 150 of the mobile phone 100 is 800×600, a resolution ratio of the screen 150 of the mobile phone 100 is 4:3. It can be learned that the resolution ratio of the screen 150 of the mobile phone 100 is inconsistent with the resolution ratio of the screen 220 of the television 200.

In some embodiments of this application, the quantities of pixels displayed on the screen of the mobile phone 100 in the horizontal direction and the vertical direction may be simultaneously adjusted, and an adjusted screen resolution of the mobile phone 100 is less than the screen resolution that exists before the adjustment. For example, to enable the screen resolution ratio of the mobile phone 100 to be 2:1 after the adjustment, the screen resolution of the mobile phone 100 may be adjusted to 700×350, 600×300, 500×250, 400×200, . . . . As shown in FIG. 9, an image 160 is a screen of the mobile phone 100 after the adjustment, and a resolution of the screen 160 is 400×200. It can be learned that a resolution ratio of the screen 160 is 2:1.

806: The mobile phone 100 sends, to the television 200 based on a projection parameter, projection data that is being displayed on the screen of the mobile phone 100, where the projection parameter includes at least the screen resolution of the mobile phone 100. For a specific process, refer to the descriptions of 406 in FIG. 4.

807: The television 200 displays the received projection data of the mobile phone 100 based on the projection parameter.

For example, as shown in FIG. 9, a resolution of a screen 160 of the mobile phone 100 is 400×200, a resolution of a screen 220 of the television 200 is 2000×1000, both screen resolution ratios of the mobile phone 100 and the television 200 are 2:1, and a screen resolution received by the television 200 is 400×200. After content displayed on the screen of the mobile phone is enlarged proportionally, the received screen resolution may be adjusted to 2000×1000. In this case, a screen area of the screen 160 of the mobile phone 100 may fully cover the screen 220 of the television 200.

Figure 10:
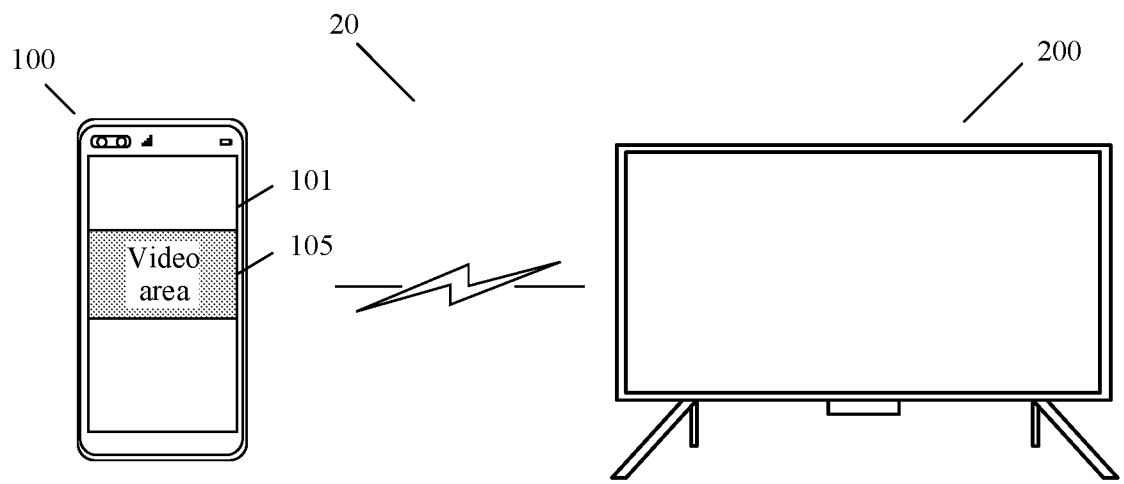
FIG. 10 is a diagram of another projection application scenario according to an embodiment of this application.

FIG. 10 shows another projection application scenario 20 according to an embodiment of this application. As shown in FIG. 10, a mobile phone 100 is screened to a television 200. A resolution ratio of a screen 101 of the mobile phone 100 is inconsistent with a resolution ratio of a video area 105, and the video area 105 fully occupies the screen 101 only in one direction. For example, in FIG. 10, the video area 105 fully occupies the screen 101 only in a horizontal direction, and does not fully occupy the screen in a vertical direction. If the mobile phone 100 is directly mirrored to the television 200, the video area 105 can only be presented in a middle area of a screen of the television 200, and black borders appear around the screen of the television 200. This affects a projection effect. According to the projection method in embodiments of this application, a resolution of the screen 101 of the mobile phone 100 is adjusted or only a resolution of the video area 105 is adjusted, so that after the mobile phone 100 is mirrored to the television 200, the video area 105 fully occupies the screen of the television 200 in at least one direction. This not only improves screen utilization of the television 200, but also achieves a better display effect of screen mirroring and improves user projection experience.

Figure 11:
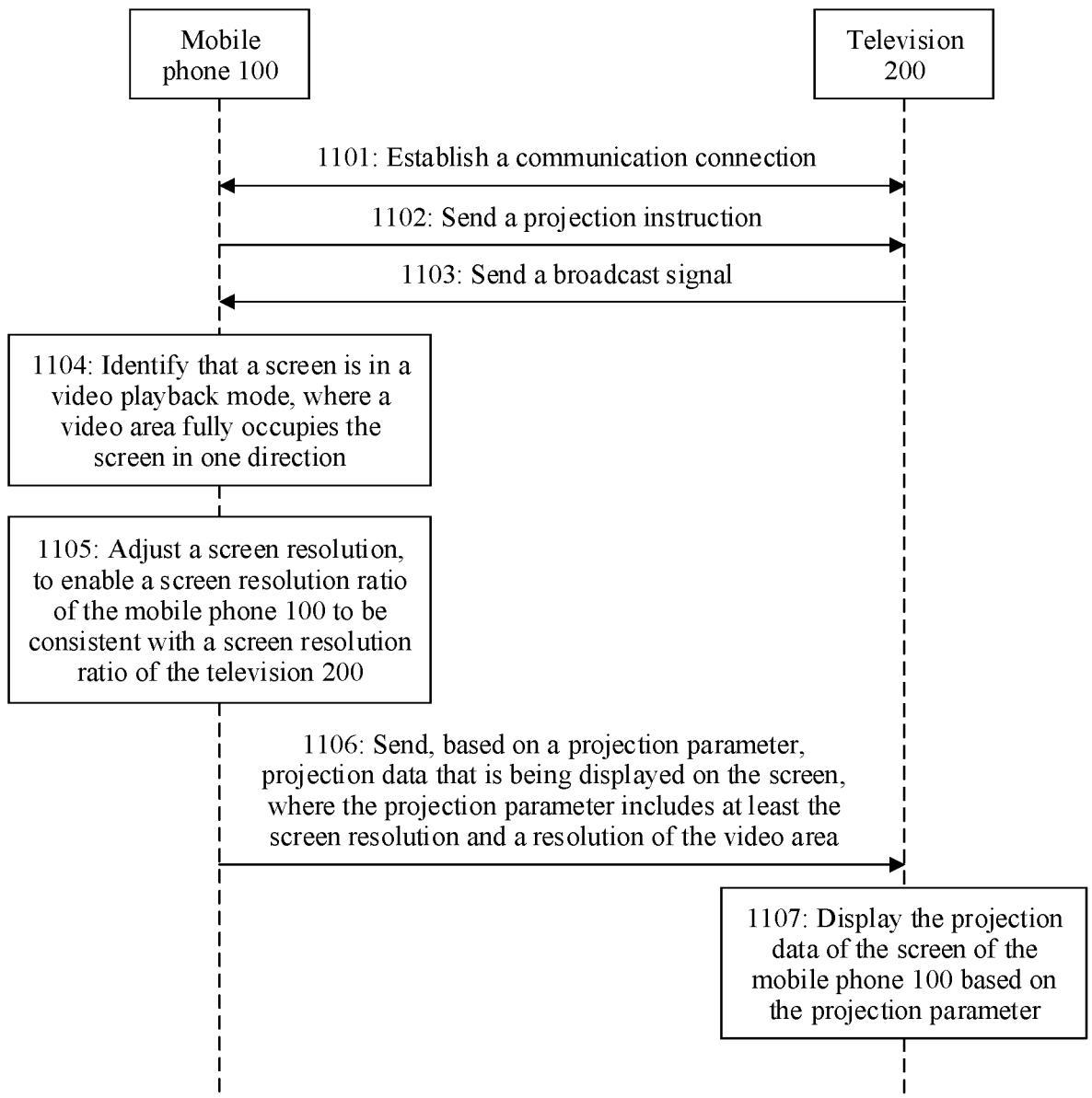
FIG. 11 is a flowchart of a method for mirroring a mobile phone 100 to a television 200 according to an embodiment of this application.

The following describes the technical solutions in embodiments of this application with reference to FIG. 11. A screen resolution of a mobile phone 100 is adjusted, to enable a screen resolution ratio of the mobile phone 100 to be consistent with a screen resolution ratio of a television 200, so that a video area fully occupies the television 200 in at least one direction. The specific solutions are as follows:

1101: The mobile phone 100 establishes a communication connection to the television 200. For a specific process, refer to the descriptions of 401 in FIG. 4.

1102: The mobile phone 100 sends a projection instruction to the television 200. For a specific process, refer to the descriptions of 402 in FIG. 4.

1103: The television 200 sends a broadcast signal to the mobile phone 100 in response to the projection instruction of the mobile phone 100, where the broadcast signal includes a current screen resolution of the television 200. For a specific process, refer to the descriptions of 403 in FIG. 4.

1104: The mobile phone 100 identifies that a current screen of the mobile phone 100 is in a video playback mode, where the video area fully occupies the screen of the mobile phone 100 in one direction.

Figure 12A:
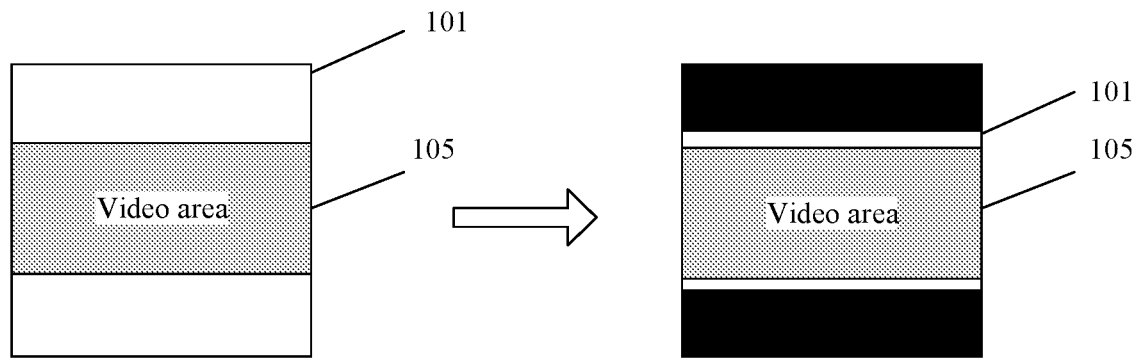
FIG. 12a is a schematic diagram of adjusting a screen resolution of a mobile phone 100 according to an embodiment of this application.

For example, as shown in FIG. 12a, if a resolution of a screen 101 of the mobile phone 100 is 2200×2480, a resolution ratio of the screen 101 is 7.1:8, and if a resolution of a video area 105 is 2200×1100, a resolution ratio of the video area is 2:1. It is clear that, the resolution ratio of the video area is inconsistent with the resolution ratio of the screen 101, and the video area 105 cannot fully occupy the entire screen 101. However, both a quantity of pixels displayed on the video area 105 in a horizontal direction and a quantity of pixels displayed of the screen 101 in the horizontal direction are 2200. It may be considered that the video area 105 fully occupies the screen 101 in the horizontal direction.

1105: The mobile phone 100 adjusts the screen resolution, to enable the screen resolution ratio to be consistent with the screen resolution ratio of the television 200. For a manner of adjusting the screen resolution by the mobile phone 100, refer to 405 in FIG. 4 or 805 in FIG. 8. Details are not described herein again.

For example, go back to FIG. 7a. If a resolution of a screen 210 of the television 200 is 3840×2160, a screen resolution ratio of the television 200 is 16:9. After obtaining the resolution of the screen 210 of the television 200, the mobile phone 100 may adjust a quantity of pixels displayed on a screen 101 in a vertical direction, to enable a resolution ratio of the screen 101 to be consistent with a resolution ratio of the screen 210 of the television 200. As shown in FIG. 12a, an adjusted resolution of the screen 101 is 2200×1238.

In this case, the resolution ratio of the screen 101 is 16:9, and is consistent with the resolution ratio of the screen 210 of the television 200.

1106: The mobile phone 100 sends, to the television 200 based on a projection parameter, projection data that is being displayed on the screen of the mobile phone 100, where the projection parameter includes at least the screen resolution of the mobile phone 100 and the resolution of the video area. For a specific process, refer to the descriptions of 406 in FIG. 4.

1107: The television 200 displays the received projection data of the mobile phone 100 based on the projection parameter.

Figure 12B:
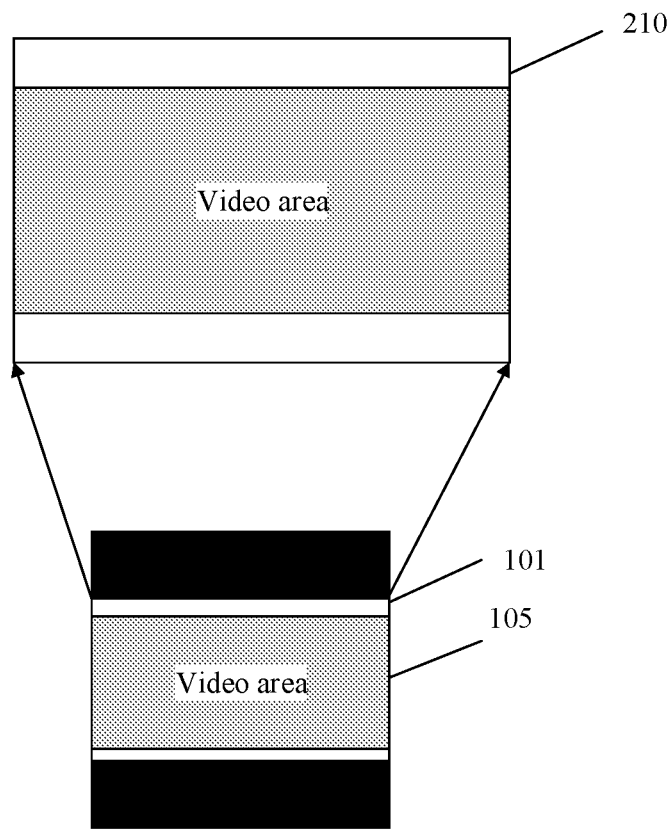
FIG. 12b is a schematic diagram of mirroring a mobile phone 100 to a television 200 according to an embodiment of this application.

For example, as shown in FIG. 12b, a resolution of a screen 101 of the mobile phone 100 received by the television 200 is 2200×1238, a resolution of a screen 210 of the television 200 is 3840×2160, and both screen resolution ratios of the mobile phone 100 and the television 200 are 16:9. After content displayed on the screen of the mobile phone is enlarged proportionally, the television 200 may adjust the received screen resolution to 3840×2160. In this case, the resolution of the video area 105 is adjusted to 3480×1740, and the video area 105 fully occupies the screen 210 of the television 200 in a horizontal direction. This not only improves screen utilization of the screen 210, but also improves a projection effect.

Figure 13:
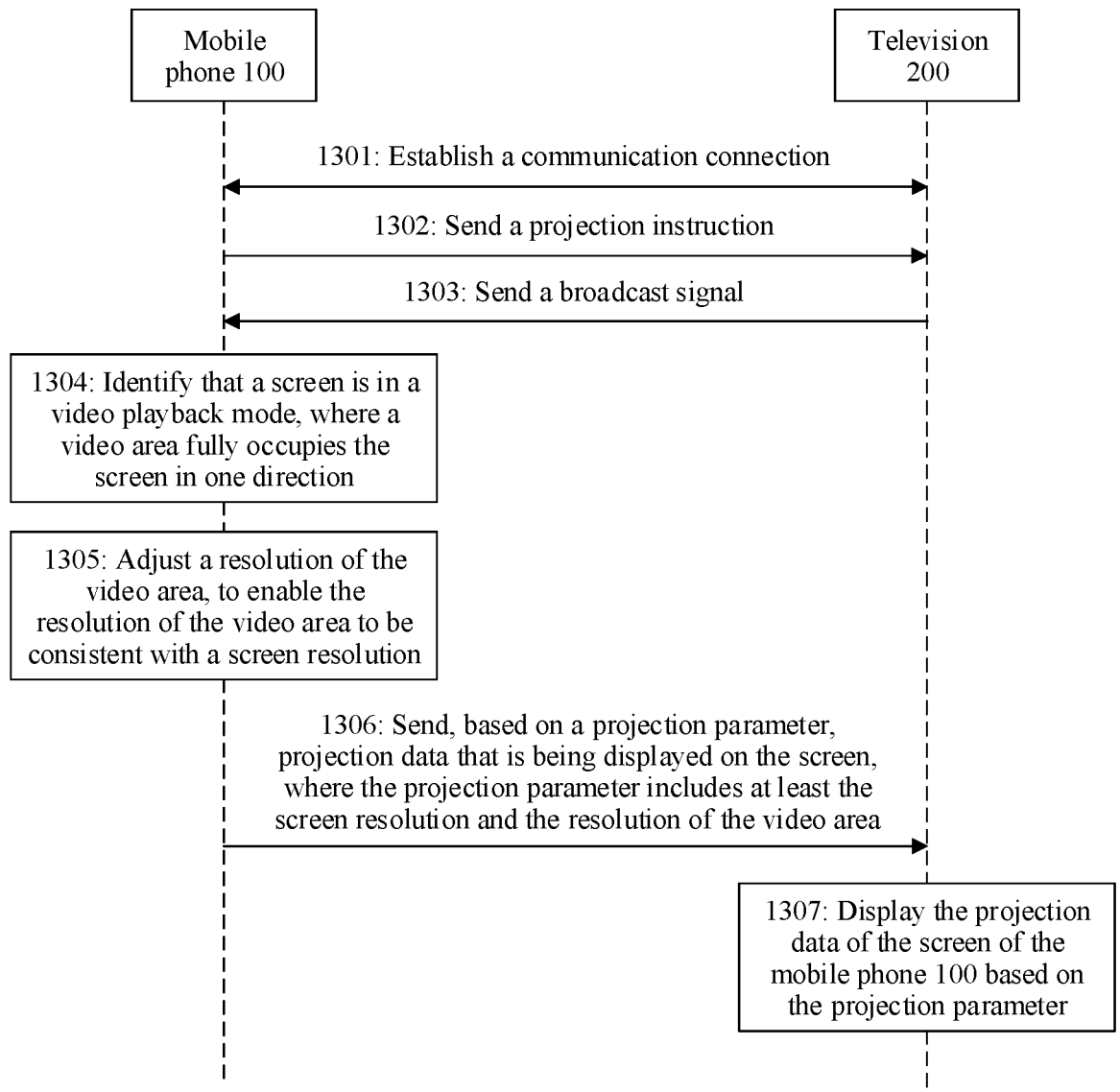
FIG. 13 is a flowchart of a method for mirroring a mobile phone 100 to a television 200 according to an embodiment of this application.

FIG. 11 describes how to improve the projection effect of screen mirroring by adjusting the screen resolution of the mobile phone 100. In some other embodiments of this application, only the resolution of the video area of the mobile phone 100 may be adjusted, and the screen resolution of the mobile phone 100 does not need to be adjusted, so that the video area can fully occupy the screen of the television 200 in at least one direction after screen mirroring. The following specifically describes the technical solutions of this application with reference to FIG. 13. As shown in FIG. 13, the technical solution includes the following steps.

1301: A mobile phone 100 establishes a communication connection to a television 200. For a specific process, refer to the descriptions of 401 in FIG. 4.

1302: The mobile phone 100 sends a projection instruction to the television 200. For a specific process, refer to the descriptions of 402 in FIG. 4.

1303: The television 200 sends a broadcast signal to the mobile phone 100 in response to the projection instruction of the mobile phone 100, where the broadcast signal includes a current screen resolution of the television 200. For a specific process, refer to the descriptions of 403 in FIG. 4.

1304: The mobile phone 100 identifies that a current screen of the mobile phone 100 is in a video playback mode, where a video window fully occupies the screen of the mobile phone 100 only in one direction. For a specific process, refer to the descriptions of 404 in FIG. 4.

1305: The mobile phone 100 adjusts a resolution of a video area, to enable the resolution of the video area to be consistent with a screen resolution of the mobile phone 100.

Figure 14A:
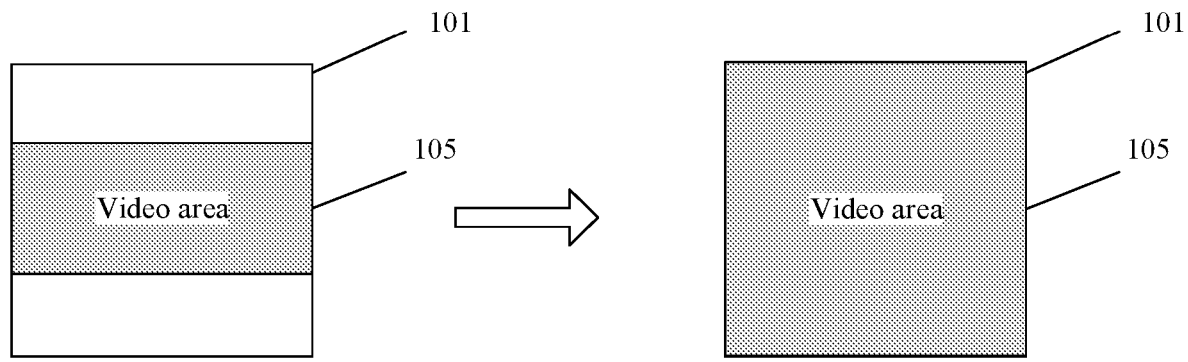
FIG. 14a is a schematic diagram of adjusting a resolution of a video of a mobile phone 100 according to an embodiment of this application.

For example, go back to FIG. 7a. If a resolution of a screen 210 of the television 200 is 3840×2160, a screen resolution ratio of the television 200 is 16:9. As shown in FIG. 14a, if a resolution of a screen 101 of the mobile phone 100 is 2200×2480, a resolution ratio of the screen 101 is 7.1:8, and if a resolution of a video area 105 is 2200×1100, a resolution ratio of the video area is 2:1. It is clear that, the resolution ratio of the video area is inconsistent with the resolution ratio of the screen 101. However, a quantity (2480) of pixels displayed on the screen 101 of the mobile phone 100 in a vertical direction is greater than a quantity (2160) of pixels displayed on the screen 210 of the television 200 in the vertical direction. Therefore, after screen mirroring, the screen 101 of the mobile phone 100 may fully occupy the screen 210 of the television 200 in the vertical direction.

In some embodiments of this application, as shown in FIG. 14*a*, the mobile phone 100 adjusts a quantity of pixels displayed on the video area 105 in the vertical direction, to enable the quantity of pixels displayed on the video area 105 in the vertical direction to be equal to the quantity of pixels displayed on the screen 101 of the mobile phone 100 in the vertical direction. For example, if the quantity of pixels displayed on the video area 105 in the vertical direction is adjusted from 1100 to 2480, the video area 105 fully occupies the screen 101.

1306: The mobile phone 100 sends, to the television 200 based on a projection parameter, projection data that is being displayed on the screen of the mobile phone 100, where the projection parameter includes at least the screen resolution of the mobile phone 100 and the screen resolution of the video area 105. For a specific process, refer to the descriptions of 406 in FIG. 4.

1307: The television 200 displays the received projection data of the mobile phone 100 based on the projection parameter.

Figure 14B:
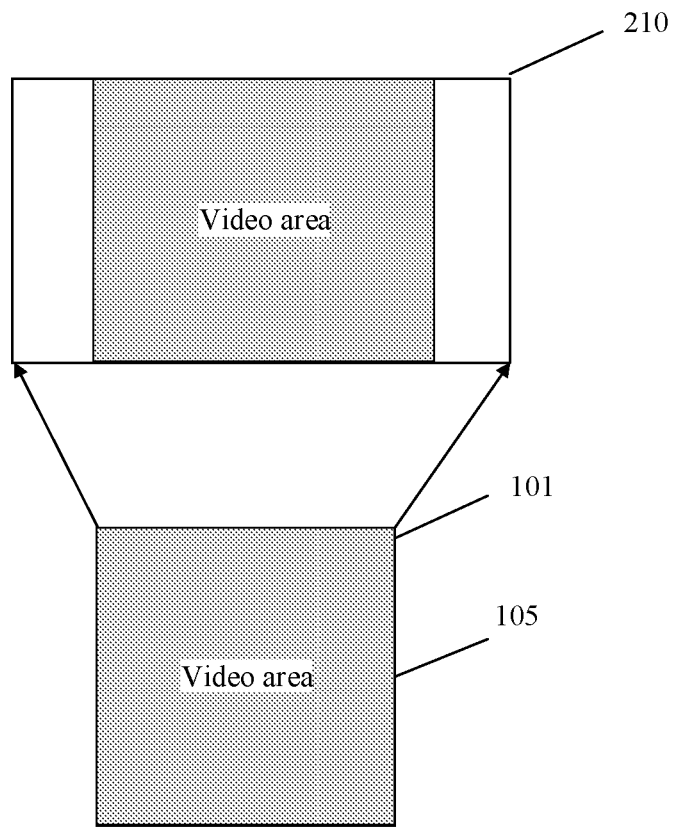
FIG. 14b is a flowchart of a method for mirroring a mobile phone 100 to a television 200 according to an embodiment of this application.

For example, as shown in FIG. 14*b*, a screen resolution of a mobile phone 100 received by the television 200 is 2200×2480, a resolution of a screen 210 of the television 200 is 3840×2160, and a resolution of the video area 105 is also 2200×2480. In this case, the video area 105 fully occupies the screen 210 of the television 200 in a vertical direction. This not only improves screen utilization of the screen 210, but also improves a projection effect.

Figure 15:
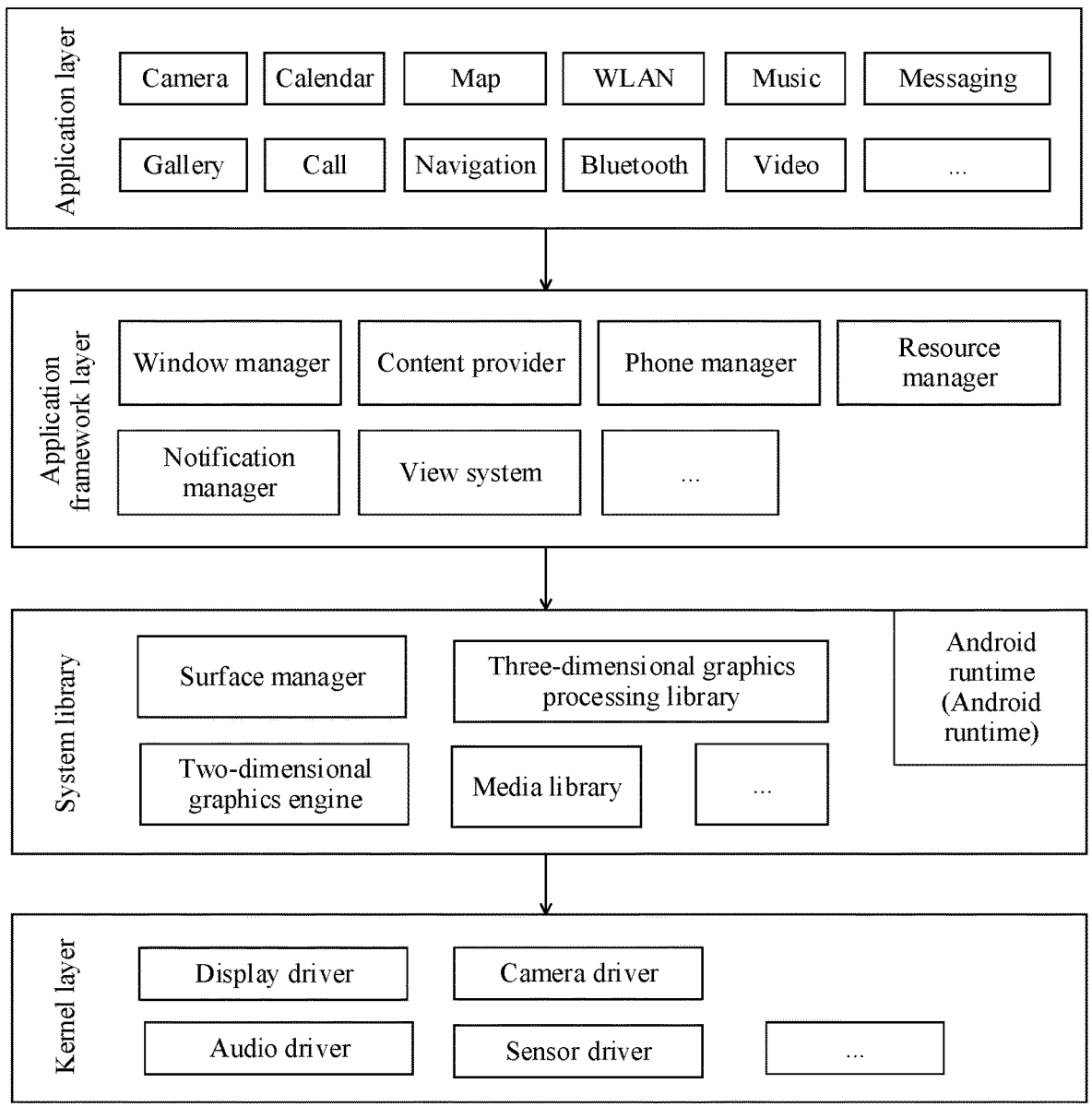
FIG. 15 is a block diagram of a software structure of a terminal device according to an embodiment of this application.

Refer to FIG. 15. A software system of a mobile phone 100 may use a layered architecture, an event-driven architecture, a microkernel architecture, a micro service architecture, or a cloud architecture. In this embodiment of this application, an Android system of the layered architecture is used as an example to describe a software structure of a terminal device. FIG. 15 is a block diagram of a software structure of a terminal device according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 15, the application packages may include applications such as Phone, Camera, Gallery, Calendar, Call, Map, Navigation, WLAN, Bluetooth, Music, Video, and Messaging.

The application framework layer provides an application programming interface (API) and a programming framework for an application at the application layer. The application framework layer includes some predefined functions.

As shown in FIG. 15, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying a picture. The view system may be configured to construct applications. A display interface may include one or more views. For example, a display interface including an SMS message notification icon may include a text display view and a picture display view.

The phone manager is configured to provide a communication function of the terminal device, for example, management of call statuses (including answering, declining, and the like).

The resource manager provides various resources such as a localized character string, an icon, a picture, a layout file, and a video file for an application.

The notification manager enables an application to display notification information in the status bar, and may be configured to transmit notification-type messages. The displayed information may automatically disappear after a short pause without user interaction. For example, the notification manager is configured to notify download completion and provide a message notification. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an announcement is given, the terminal device vibrates, or an indicator light blinks.

Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playing and recording of a plurality of commonly used audio and video formats, static image files, and the like. The media library may support a plurality of audio and video coding formats, such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

A software system of a television 200 is similar to a software system of a mobile phone 100, and may use a layered architecture, an event-driven architecture, a micro-kernel architecture, a micro service architecture, a cloud architecture, or the like. When the software system of the television 200 is an Android system using the layered architecture, for a structure and a function of each layer in the Android system, refer to the related descriptions in FIG. 15. Details are not described herein again.

In this specification, a reference to "an embodiment" or "embodiments" means that a specific feature, structure, or characteristic described with reference to the embodiment is included in at least one example implementation solution or technology according to this application. In this specification, the phrases "in an embodiment" do not necessarily all represent a same embodiment.

This application also relates to an apparatus for performing operations in the text. The apparatus may be constructed specifically for the required purpose or may include a general-purpose computer selectively activated or reconfigured by a computer program stored in a computer. Such a computer program may be stored in a computer-readable medium, for example, but not limited to any type of disk, including a floppy disk, an optical disc, a CD-ROM, a magneto-optical disc, a read-only memory (ROM), a random access memory (RAM), an EPROM, an EEPROM, a magnetic or optical card, an application-specific integrated circuit (ASIC), or any type of medium that is suitable for storing electronic instructions, and each may be coupled to a computer system bus. In addition, the computer mentioned in this specification may include a single processor or may use an architecture involving a plurality of processors for increased computing power.

The processes and displays presented herein are not inherently related to any specific computer or other apparatus. Various general-purpose systems may also be used in conjunction with programs taught herein, or it may be proved convenient to construct more specialized apparatuses to perform one or more method steps. Structures for the various systems are discussed in the following descriptions. In addition, any specific programming language enough to implement the technologies and implementations of this application may be used. Various programming languages may be used to implement embodiments of this application, as discussed herein.

In addition, the language used in this specification has been primarily chosen for readability and guidance purposes and may not be chosen to describe or limit the subject matter of this application. Therefore, this application is intended to describe and not limit the scope of the concepts discussed herein.

What is claimed is:

1. An electronic device projection method, applied to a first electronic device, wherein the first electronic device is communicatively connected to a second electronic device, and the method comprises:
   obtaining a screen resolution of the first electronic device;
   obtaining a screen resolution of the second electronic device, wherein a screen resolution ratio of the second electronic device does not equal to a screen resolution ratio of the first electronic device;
   adjusting the screen resolution of the first electronic device, to enable the screen resolution ratio of the first electronic device to be equal to the screen resolution ratio of the second electronic device;
   collecting screen data from the first electronic device, and sending the screen data to the second electronic device, to display screen content from the first electronic device on the second electronic device; and
   wherein that a screen resolution ratio of the second electronic device is not equal to a screen resolution ratio of the first electronic device comprise one of the following:
   the screen resolution ratio of the second electronic device is greater than the screen resolution ratio of the first electronic device, $$\frac{A}{B} > \frac{a}{b};$$

and
the screen resolution ratio of the second electronic device is less than the screen resolution ratio of the first electronic device, $$\frac{A}{B} < \frac{a}{b},$$

wherein
$a$ and A respectively represent quantities of pixels displayed on screens of the first electronic device and the second electronic device in a first direction, b and B respectively represent quantities of pixels displayed on the screens of the first electronic device and the second electronic device in a second direction, and the first direction and the second direction are perpendicular to each other.

2. The method according to claim 1, wherein the first electronic device plays a video in a full-screen mode, and in the full-screen mode, a resolution of the video is equal to the screen resolution of the first electronic device.

3. The method according to claim 1, wherein when the screen resolution ratio of the second electronic device is greater than the screen resolution ratio of the first electronic device, the adjusting the screen resolution of the first electronic device, to enable the screen resolution ratio of the first electronic device to be equal to the screen resolution ratio of the second electronic device comprises:
   adjusting the quantity of pixels displayed on the screen of the first electronic device in the second direction, and keeping the quantity of pixels displayed on the screen of the first electronic device in the first direction unchanged, to enable an adjusted screen resolution of the first electronic device to be:

$$a \times \left(\frac{a}{A} \times B\right),$$

wherein
$\alpha$ represents an adjusted quantity of pixels displayed on the screen of the first electronic device in the first direction, and $$\frac{a}{A} \times B$$

represents an adjusted quantity of pixels displayed on the screen of the first electronic device in the second direction.

4. The method according to claim 1, wherein when the screen resolution ratio of the second electronic device is less than the screen resolution ratio of the first electronic device, the adjusting the screen resolution of the first electronic device, to enable the screen resolution ratio of the first electronic device to be equal to the screen resolution ratio of the second electronic device comprises:

adjusting the quantity of pixels displayed on the screen of the first electronic device in the first direction, and keeping the quantity of pixels displayed on the screen of the first electronic device in the second direction unchanged, to enable an adjusted screen resolution of the first electronic device to be:

$$\left(\frac{b}{B} \times A\right) \times b,$$

wherein $$\frac{b}{B} \times A$$

represents an adjusted quantity of pixels displayed on the screen of the first electronic device in the first direction, and b represents an adjusted quantity of pixels displayed on the screen of the first electronic device in the second direction.

5. The method according to claim 1, wherein the adjusting the screen resolution of the first electronic device, to enable the screen resolution ratio of the first electronic device to be equal to the screen resolution ratio of the second electronic device further comprises:

simultaneously adjusting the quantities of pixels displayed on the screen of the first electronic device in the first direction and the second direction, to enable the screen resolution ratio of the first electronic device after the adjustment to be equal to the screen resolution ratio of the second electronic device.

6. The method according to claim 1, wherein the first electronic device plays a video in a first mode, and in the first mode, a resolution of the video is not equal to the screen resolution of the first electronic device.

7. The method according to claim 6, wherein when the resolution of the video is not equal to the screen resolution of the first electronic device, and quantities of pixels displayed on the video and a screen of the first electronic device in a first direction are equal, a quantity of pixels displayed on the video in a second direction is less than a quantity of pixels displayed on the screen of the first electronic device in the second direction.

8. The method according to claim 7, comprising:

adjusting the screen resolution of the first electronic device, to enable the screen resolution ratio of the first electronic device to be equal to the screen resolution ratio of the second electronic device; and collecting the screen data of the first electronic device, and sending the screen data to the second electronic device, to display the screen content of the first electronic device on the second electronic device, wherein quantities of pixels displayed on the video and a screen of the second electronic device in at least one direction are equal.

9. The method according to claim 7, comprising:

adjusting the quantity of pixels displayed on the video in the second direction, to enable the quantities of pixels displayed on the video and the screen of the first electronic device in the second direction to be equal; and collecting the screen data of the first electronic device, and sending the screen data to the second electronic device, to display the screen content of the first electronic device on the second electronic device, wherein quantities of pixels displayed on the video and a screen of the second electronic device in at least one direction are equal.

10. An electronic device, comprising:

a screen;

a non-transitory memory, wherein the memory stores instructions; and a processor, wherein the processor is coupled to the memory, and when program instructions stored in the memory are executed by the processor, the electronic device which is a first electronic device is enabled to perform operations comprising:

obtaining a screen resolution of the first electronic device;

obtaining a screen resolution of the second electronic device, wherein a screen resolution ratio of the second electronic device does not equal to a screen resolution ratio of the first electronic device;

adjusting the screen resolution of the first electronic device, to enable the screen resolution ratio of the first electronic device to be equal to the screen resolution ratio of the second electronic device;

collecting screen data from the first electronic device, and sending the screen data to the second electronic device, to display screen content from the first electronic device on the second electronic device; and wherein that the screen resolution ratio of the second electronic device is not equal to the screen resolution ratio of the first electronic device comprise one of the following:

the screen resolution ratio of the second electronic device is greater than the screen resolution ratio of the first electronic device, $$\frac{A}{B} > \frac{a}{b};$$

and the screen resolution ratio of the second electronic device is less than the screen resolution ratio of the first electronic device, $$\frac{A}{B} < \frac{a}{b},$$

wherein

α and A respectively represent quantities of pixels displayed on screens of the first electronic device and the second electronic device in a first direction, b and B respectively represent quantities of pixels displayed on the screens of the first electronic device and the second electronic device in a second direction, and the first direction and the second direction are perpendicular to each other.

11. The electronic device according to claim 10, wherein the first electronic device plays a video in a full-screen mode, and in the full-screen mode, a resolution of the video is equal to the screen resolution of the first electronic device.

12. The electronic device according to claim 10, wherein when the screen resolution ratio of the second electronic device is greater than the screen resolution ratio of the first electronic device, the adjusting the screen resolution of the first electronic device, to enable the screen resolution ratio of the first electronic device to be equal to the screen resolution ratio of the second electronic device comprises:

adjusting the quantity of pixels displayed on the screen of the first electronic device in the second direction, and keeping the quantity of pixels displayed on the screen of the first electronic device in the first direction unchanged, to enable an adjusted screen resolution of the first electronic device to be:

$$a \times \left(\frac{a}{A} \times B\right),$$

wherein

α represents an adjusted quantity of pixels displayed on the screen of the first electronic device in the first direction, and $$\frac{a}{A} \times B$$

represents an adjusted quantity of pixels displayed on the screen of the first electronic device in the second direction.

13. The electronic device according to claim 10, wherein when the screen resolution ratio of the second electronic device is less than the screen resolution ratio of the first electronic device, the adjusting the screen resolution of the first electronic device, to enable the screen resolution ratio of the first electronic device to be equal to the screen resolution ratio of the second electronic device comprises:

adjusting the quantity of pixels displayed on the screen of the first electronic device in the first direction, and keeping the quantity of pixels displayed on the screen of the first electronic device in the second direction unchanged, to enable an adjusted screen resolution of the first electronic device to be:

$$\left(\frac{b}{B} \times A\right) \times b,$$

wherein $$\frac{b}{B} \times A$$

represents an adjusted quantity of pixels displayed on the screen of the first electronic device in the first direction, and b represents an adjusted quantity of pixels displayed on the screen of the first electronic device in the second direction.

14. The electronic device according to claim 10, wherein the adjusting the screen resolution of the first electronic device, to enable the screen resolution ratio of the first electronic device to be equal to the screen resolution ratio of the second electronic device further comprises:

simultaneously adjusting the quantities of pixels displayed on the screen of the first electronic device in the first direction and the second direction, to enable the screen resolution ratio of the first electronic device after the adjustment to be equal to the screen resolution ratio of the second electronic device.

15. The electronic device according to claim 10, wherein the first electronic device plays a video in a first mode, and in the first mode, a resolution of the video is not equal to the screen resolution of the first electronic device.

16. The electronic device according to claim 15, wherein when the resolution of the video is not equal to the screen resolution of the first electronic device, and quantities of pixels displayed on the video and a screen of the first electronic device in a first direction are equal, a quantity of pixels displayed on the video in a second direction is less than a quantity of pixels displayed on the screen of the first electronic device in the second direction.

17. The electronic device according to claim 16, when program instructions stored in the memory are executed by the processor, the electronic device is enabled to perform further operations comprising:

adjusting the screen resolution of the first electronic device, to enable the screen resolution ratio of the first electronic device to be equal to the screen resolution ratio of the second electronic device; and collecting the screen data of the first electronic device, and sending the screen data to the second electronic device, to display the screen content of the first electronic device on the second electronic device, wherein quantities of pixels displayed on the video and a screen of the second electronic device in at least one direction are equal.

18. A non-transitory computer readable medium which contains computer-executable instructions, wherein the computer-executable instructions, when executed by a processor, enables a first electronic device to perform operations comprising:

obtaining a screen resolution of the first electronic device;

obtaining a screen resolution of the second electronic device, wherein a screen resolution ratio of the second electronic device does not equal to a screen resolution ratio of the first electronic device;

adjusting the screen resolution of the first electronic device, to enable the screen resolution ratio of the first electronic device to be equal to the screen resolution ratio of the second electronic device;

collecting screen data from the first electronic device, and sending the screen data to the second electronic device, to display screen content from the first electronic device on the second electronic device; and wherein that a screen resolution ratio of the second electronic device is not equal to a screen resolution ratio of the first electronic device comprise one of the following:

the screen resolution ratio of the second electronic device is greater than the screen resolution ratio of the first electronic device, $$\frac{A}{B} > \frac{a}{b};$$

and
the screen resolution ratio of the second electronic device is less than the screen resolution ratio of the first electronic device, $$\frac{A}{B} < \frac{a}{b},$$

wherein

α and A respectively represent quantities of pixels displayed on screens of the first electronic device and the second electronic device in a first direction, b and B respectively represent quantities of pixels displayed on the screens of the first electronic device and the second electronic device in a second direction, and the first direction and the second direction are perpendicular to each other.

19. The non-transitory computer readable medium according to claim 18, wherein the first electronic device plays a video in a first mode, and in the first mode, a resolution of the video is not equal to the screen resolution of the first electronic device.

20. The non-transitory computer readable medium according to claim 19, wherein when the resolution of the video is not equal to the screen resolution of the first electronic device, and quantities of pixels displayed on the video and a screen of the first electronic device in a first direction are equal, a quantity of pixels displayed on the video in a second direction is less than a quantity of pixels displayed on the screen of the first electronic device in the second direction.

* * * * *